(12) United States Patent
Aubuchon

(10) Patent No.: US 7,518,781 B2
(45) Date of Patent: Apr. 14, 2009

(54) MICROMIRROR SYSTEMS WITH ELECTRODES CONFIGURED FOR SEQUENTIAL MIRROR ATTRACTION

(75) Inventor: Christopher M. Aubuchon, Palo Alto, CA (US)

(73) Assignee: Exajoule LLC, Palo Alto, CA (US)

( * ) Notice: Subject to any disclaimer, the term of this patent is extended or adjusted under 35 U.S.C. 154(b) by 0 days.

(21) Appl. No.: 11/633,690

(22) Filed: Dec. 4, 2006

(65) Prior Publication Data

US 2007/0081225 A1    Apr. 12, 2007

Related U.S. Application Data

(63) Continuation of application No. 11/000,337, filed on Nov. 29, 2004, now Pat. No. 7,145,711, which is a continuation of application No. 10/269,763, filed on Oct. 11, 2002, now Pat. No. 6,825,968.

(51) Int. Cl.
*G02B 26/00*   (2006.01)

(52) U.S. Cl. .................... 359/290; 359/291; 359/292

(58) Field of Classification Search .............. 359/290, 359/291, 292, 295, 298, 223, 230, 224, 245, 359/320, 323, 324
See application file for complete search history.

(56) References Cited

U.S. PATENT DOCUMENTS

| | | |
|---|---|---|
| 5,083,857 A | 1/1992 | Hornbeck |
| 5,096,279 A | 3/1992 | Hornbeck |
| 5,203,208 A | 4/1993 | Bernstein |
| 5,212,582 A | 5/1993 | Nelson |
| 5,535,047 A | 7/1996 | Hornbeck |
| 5,583,688 A | 12/1996 | Hornbeck |
| 5,600,383 A | 2/1997 | Hornbeck |
| 5,661,591 A | 8/1997 | Lin et al. |
| 5,777,719 A | 7/1998 | Williams et al. |
| 5,835,256 A | 11/1998 | Huibers |
| 5,991,066 A | 11/1999 | Robinson et al. |
| 6,028,689 A | 2/2000 | Michalicek et al. |
| 6,028,690 A | 2/2000 | Carter et al. |
| 6,198,180 B1 | 3/2001 | Garcia |
| 6,232,936 B1 | 5/2001 | Gove et al. |
| 6,255,454 B1 | 7/2001 | Keifer et al. |
| 6,323,982 B1 | 11/2001 | Hornbeck |
| 6,329,738 B1 | 12/2001 | Hung et al. |
| 6,334,685 B1 | 1/2002 | Slobodin |
| 6,337,760 B1 | 1/2002 | Huibers et al. |
| 6,338,559 B1 | 1/2002 | Williams et al. |
| 6,351,330 B2 | 2/2002 | Ko |
| 6,356,378 B1 | 3/2002 | Huibers |
| 6,360,036 B1 | 3/2002 | Couillard |
| 6,369,931 B1 | 4/2002 | Funk et al. |
| 6,385,364 B1 | 5/2002 | Abushagur |

(Continued)

*Primary Examiner*—Hung X Dang
*Assistant Examiner*—Tuyen Q Tra
(74) *Attorney, Agent, or Firm*—DLA Piper LLP (US)

(57) ABSTRACT

Micromirror devices, especially for use in digital projection are disclosed. Other applications are contemplated as well. The devices employ a superstructure that includes a mirror supported over a hinge set above a substructure. Various improvements to the superstructure over known micromirror devices are provided. The features described are applicable to improve manufacturability, enable further miniaturization of the elements and/or to increase relative light return. Devices can be produced utilizing the various optional features described herein, possibly offering cost savings, lower power consumption, and higher resolution.

38 Claims, 21 Drawing Sheets

U.S. PATENT DOCUMENTS

| | | |
|---|---|---|
| 6,388,661 B1 | 5/2002 | Richards |
| 6,389,190 B2 | 5/2002 | Solgaard et al. |
| 6,392,221 B1 | 5/2002 | Aksyuk et al. |
| 6,396,619 B1 | 5/2002 | Huibers |
| 6,396,975 B1 | 5/2002 | Wood et al. |
| 6,404,943 B1 | 6/2002 | Wang |
| 6,407,851 B1 | 6/2002 | Islam et al. |
| 6,411,751 B1 | 6/2002 | Giles et al. |
| 6,411,754 B1 | 6/2002 | Akkaraju et al. |
| 6,414,803 B1 | 7/2002 | Pan et al. |
| 6,418,247 B1 | 7/2002 | Presley |
| 6,457,833 B1 | 10/2002 | Ishikawa et al. |
| 6,487,001 B2 | 11/2002 | Greywall |
| 6,522,454 B2 | 2/2003 | Meier et al. |
| 6,552,840 B2 | 4/2003 | Knipe |
| 6,567,134 B1 | 5/2003 | Morgan |
| 6,614,576 B2 | 9/2003 | Strumpell et al. |
| 6,642,969 B2 | 11/2003 | Tew |
| 6,698,895 B2 | 3/2004 | Hatakeyama et al. |
| 6,714,353 B2 | 3/2004 | Park et al. |
| 6,798,560 B2 | 9/2004 | Aubuchon |
| 6,825,968 B2 | 11/2004 | Aubuchon |
| 6,870,659 B2 | 3/2005 | Aubuchon |
| 7,011,415 B2 | 3/2006 | DiCarlo et al. |
| 2002/0093721 A1 | 7/2002 | Knipe |
| 2003/0002019 A1 | 1/2003 | Miller |
| 2003/0117686 A1 | 6/2003 | DiCarlo |

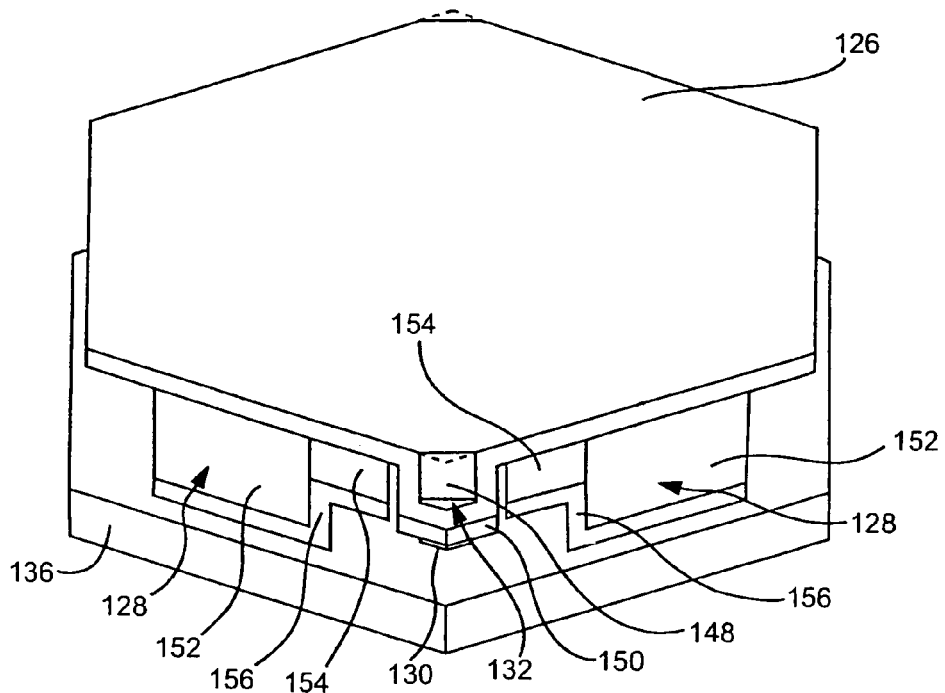
FIG. 9A"
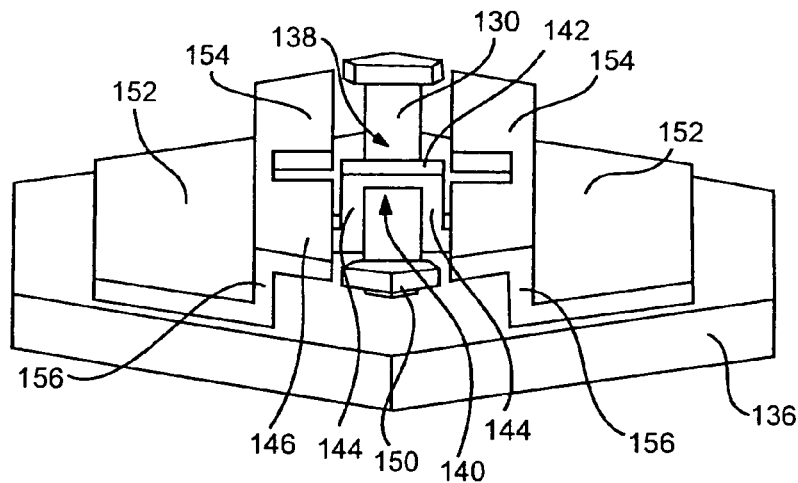
FIG. 9B"
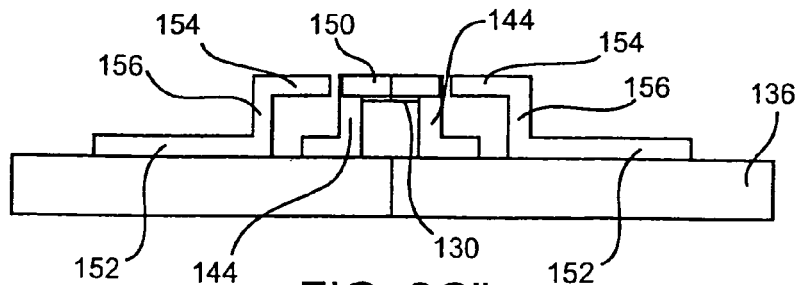
FIG. 9C"

MICROMIRROR SYSTEMS WITH ELECTRODES CONFIGURED FOR SEQUENTIAL MIRROR ATTRACTION

PRIORITY CLAIMS

This application is a continuation application of and claims priority under 35 USC 120 to U.S. patent application Ser. No. 11/000,337 filed on Nov. 29, 2004 now U.S. Pat. No. 7,145,711 and entitled "Micromirror systems with electrodes configured for sequential mirror attraction" which is a continuation of and claims priority under 35 USC 120 to U.S. patent application Ser. No. 10/269,763 filed on Oct. 11, 2002 (now U.S. Pat. No. 6,825,968), both of which are incorporated herein by reference.

FIELD OF THE INVENTION

The present invention generally relates to the field of spatial light modulators that can form optical images by the modulation of incident light. The invention may involve micro electro-mechanical systems (MEMS) in the form of micromirror device arrays for use in optical display, adaptive optics and/or switching applications. Optionally, the invention also comprises individual or isolated micromirror elements.

BACKGROUND OF THE INVENTION

Generally, MEMS devices are small structures, typically fabricated on a semiconductor wafer using processing techniques including optical lithography, metal sputtering, plasma oxide deposition, and plasma etching developed for the fabrication of integrated circuits. Micromirror devices are a type of MEMS device. Other types of MEMS devices include accelerometers, pressure and flow sensors, fuel injectors, inkjet ports, and gears and motors—to name a few. Micromirror devices have already met with a great deal of commercial success.

Micromirror devices are primarily used in optical display systems. The large demand for micromirror-based display systems is a result of the superior image quality the systems can provide. Commercial and home-theater segments drive this facet of market demand. Other market segments are characterized by cost concerns more than image quality concerns. Since these devices are produced in bulk on semiconductor wafers, they take advantage of the same wafer processing economies of scale that characterize the semiconductor industry, thus making the sale of these devices competitive at all price points.

In display systems, the micromirror device is a light modulator that often uses digital image data to modulate a beam of light by selectively reflecting portions of the beam of light to a display screen. While analog modes of operation are possible, many micromirror devices are operated in a digital bistable mode of operation.

The unique properties of current and future micromirror-based display systems will allow them to capture market share for applications including theatre and conference room projectors, institutional projectors, home theater, standard television and high definition displays from various lesser-quality solutions including liquid crystal display (LCD) and cathode ray tube (CRT) type systems. Micromirror-based display systems now offer compact, high resolution and high brightness alternatives to other existing technology.

Presently, such systems are further characterized by: all-digital display (mirror control is completely digital except for the possible A/D conversion necessary at the source); progressive display (removing interlace display artifacts such as flicker—sometimes necessitating an interlace to progressive scan conversion); fixed display resolution (the number of mirrors on the device defines the mirror array resolution; combined with the 1:1 aspect ratio of the on-screen pixels, the fixed ratio presently requires re-sampling of various input video formats to fit onto the micromirror array); digital color creation (spectral characteristics of color filters and lamp(s) are coupled to digital color processing in the system); and digital display transfer characteristics (micromirror device displays exhibit a linear relationship between the gray scale value used to modulate the mirrors and the corresponding light intensity, thus a "de-gamma" process is performed as part of the video processing prior to display).

MEMS display devices have evolved rapidly over the past ten to fifteen years. Early devices used a deformable reflective membrane that was electrostatically attracted to an underlying address electrode. When address voltage was applied, the membrane would dimple toward the address electrode. Schlieren optics was used to illuminate the membrane and create an image from the light scattered by the dimpled portions of the membrane. The images formed by Schlieren systems were very dim and had low contrast ratios, making them unsuitable for most image display applications.

Later generation micromirror devices used flaps or cantilever beams of silicon or aluminum, coupled with dark-field optics to create images having improved contrast ratios. These devices typically used a single metal layer to form the reflective layer of the device. This single metal layer bent downward over the length of the flap or cantilever when attracted by the underlying address electrode, creating a curved surface. Incident light was scattered by this surface thereby lowering the contrast ratio of images formed with flap or cantilever beam devices.

Devices utilizing a mirror supported by adjacent torsion bar sections were then developed to improve the image contrast ratio by concentrating the deformation on a relatively small portion of the reflecting surface. These devices used a thin metal layer to form a torsion bar, which is often referred to as the hinge, and a thicker metal layer to form a rigid member. The thicker member typically has a mirror-like surface. The rigid mirror remains flat while the torsion hinges deform, minimizing the amount of light scattered by the device and improving its contrast ratio. Though improved, the support structure of these devices was in the optical path, and therefore contributed to an unacceptable amount of scattered light.

The more successful micromirror configurations have incorporated a "hidden-hinge" or concealed torsion/flexure member(s) to further improve the image contrast ratio by using an elevated mirror to block most of the light from reaching the device support structures. Because the mirror support structures that allow it to rotate are underneath the mirror instead of around the perimeter of the mirror, more of the surface area of the device is available to reflect light corresponding to the pixel image. Since much of the light striking a concealed-flexure micromirror device reaches an active pixel surface and is either used to form an image pixel or reflected away from the image to a light trap, the contrast ratio of such a device is much higher than the contrast ratio of other known devices.

Some of this progression is published on the world wide web site of Texas Instruments. Further review and technical details as may be employed (including in the present invention) are presented in MEMS and MOEMS Technology and Applications, by P. Rai-Choudhury, 169-208 (SPIE Press, 2000).

Despite such advances in design, several aspects of known micromirror devices may be further improved. First, general considerations of manufacturability, which play directly into cost, may be improved. For instance, increasing the yield of devices (in the form of pixels that pass functional criteria) from a given processed wafer offers both improvement in product quality and cost savings. In addition, less complicated manufacturing procedures, including a process requiring fewer masks or steps for production of micromirror devices would be desirable.

Still further, performance aspects of existing micromirror devices can be improved. One such aspect concerns increasing the percentage of light return from the micromirrors. Another involves the angular displacement that can be realized in deflecting a given mirror. The overall deflection ability or total angular resolution can be particularly important in terms of optical switching applications as well as in the contrast ratio of image production.

Yet another performance aspect in which improvement is possible concerns power consumption. Micromirror devices currently in production for SVGA applications include over half a million active mirrors, SXGA applications require over one point three million active mirrors. Since powering so many elements has a cumulative effect, addressing power consumption issues will be of increasing importance in the future as the number of pixels employed in image creation continues to increase.

Yet another avenue for micromirror device improvement lies in continued miniaturization of the devices. In terms of performance, this can improve power consumption since, smaller distances between parts and lower mass parts will improve energy consumption and increase display system resolution by providing a micromirror device with greater mirror density given overall package size constraints. In terms of manufacturing, continued miniaturization of mirror elements can offer a greater number of micromirror systems for a wafer of a given size.

Various aspects of the present invention offer improvement in terms of one or more of the considerations noted above. Of course, certain features may be offered in one variation of the invention, but not another. In any case, features offered by aspects of the present invention represent a departure from structural approaches represented by the Texas Instruments DMD™. The inventive features represent an altogether distinct evolutionary branch of "hidden-hinge" or concealed-flexure micromirror device development, rather than mere sequential refinement of features as may be noted in the development of the Texas Instruments DMD™ element described in detail below. The divergent approaches marked by aspects of the present invention offer a competitive edge to the present invention to benefit consumers in any of a number of ways.

SUMMARY OF THE INVENTION

The present invention involves micromirror structures, optionally used in display systems. Micromirror array devices according to the present invention generally comprise a superstructure disposed over a substructure including addressing features. Features of the superstructure set upon and above the substrate include electrodes, hinges, mirrors/micromirrors, support members or portions thereof.

The electrodes used to actuate the mirrors are arranged so they progressively attract mirror portions. This may be accomplished using electrode portions that step down from a higher level close to a mirror's hinge to a lower outer level. With a portion of each electrode being closer to said mirror closer to a center of said mirror and another portion of each electrode being farther from said mirror further from said mirror center both sequential attraction of a mirror by said electrode portions and clearance for allowing adequate mirror tilt is possible.

Electrodes thus configured may be supported in any manner, whether provided by a unitary structure or separately built-up portions. A plurality of discrete planar levels (as few as two) may be provided, or even one or more angled electrode surfaces. Electrode variations in which high multiples of levels or stages are employed will model a true angular surface. Such angular and even curved surfaces are within the scope of the invention.

Whereas the referenced Texas Instruments DMD™ employs electrodes at different heights, the attraction effected is not sequential in the sense discussed herein. What is more, according to a preferred variation of the present invention, only a single surface (the underside of the mirror) interacts electrostatically with the different height electrodes. Systems thus provided, that still allow adequate forcing of its mirror elements to achieve sufficient tilt angles in opposition to restoring forces, can still be manufactured with a five mask process (in contrast to the six mask process of the referenced Texas Instruments device).

The present invention includes any of these improvements described either individually, or in combination. Systems employing micromirror devices including the improved superstructure form aspects of the invention as does methodology associated with the use and manufacture of apparatus according to the present invention.

BRIEF DESCRIPTION OF THE DRAWINGS

FIGS. 1-8H represent information known in the art, in which FIGS. 6 and 8A-8H represent aspects of a known micromirror device. The features shown in the other figures may be used in the present invention. FIGS. 9A-15H show features particular to the present invention.

FIG. 2 is a perspective-combined view illustrating the projection of three pixels utilizing a portion of a micromirror device display system.

FIG. 3 is a perspective view illustrating grayscale image production for a single line of mirrors in a micromirror device utilizing pulse width modulation (PWM).

FIG. 4 is a perspective view of an exemplary color micromirror projection system.

FIG. 6 is an exploded perspective view of a DMD element.

FIG. 7 is a circuit diagram showing a manner of addressing a micromirror device array.

FIGS. 8A-8H are perspective views showing the micromirror elements of FIG. 6 at various stages of production.

FIG. 9A shows a perspective view of a micromirror element according to the present invention; FIGS. 9A'-9C' show the same views of another variation of the invention employing an alternate mirror support approach. FIGS. 9A"-9C" show the same views of a further variation of the present invention that employs a hexagonal mirror.

FIG. 11A is a top view comparing the DMD™ of FIG. 6 with the micromirror device of FIG. 8; FIG. 11B is a perspective view of arrays of elements as shown in FIG. 11A.

FIGS. 15A-15H are side views of various electrode configurations employing a variety of levels, shapes and support approaches.

DETAILED DESCRIPTION OF AN EMBODIMENT

Figures 1A, 1B:
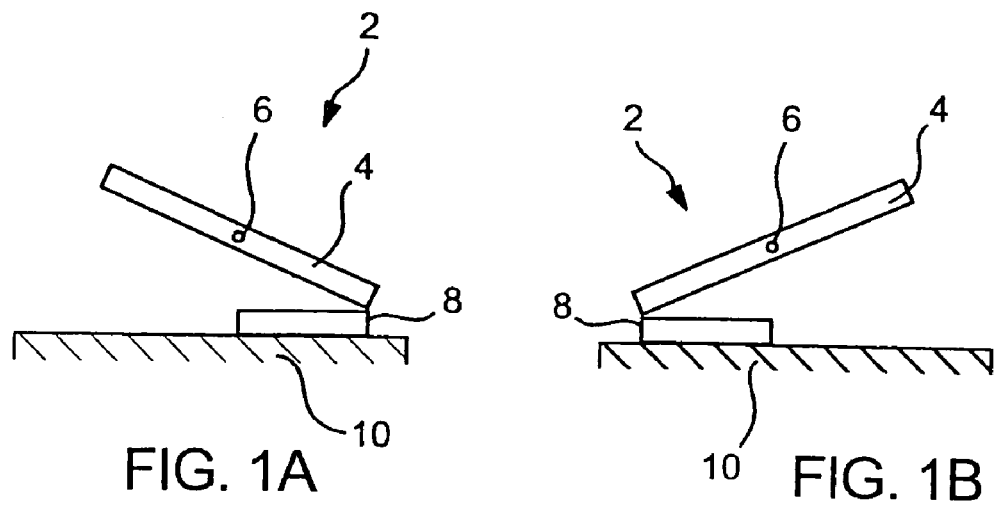
FIGS. 1A and 1B are side views illustrating bi-stable micromirror operation.

In describing the invention in greater detail than provided in the Summary above, applicable technology is first described. This discussion is followed by description of a known micromirror device and its manner of production. Then a variation of a micromirror device according to the present invention is disclosed, as well as a preferred manner of production. Next, comparative views of the known and inventive micromirror devices are described. Finally, additional optional aspects of the present invention are described, including various optional support, micromirror and electrode configurations.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, shape of design, composition of matter, process, process act(s) or step(s), to the objective(s), spirit or scope of the present invention. All such modifications are intended to be within the scope of the claims made herein.

Methods recited herein may be carried out in any order of the recited events which are logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "and," "said" and "the" include plural referents unless the context clearly dictates otherwise. It is further noted that the claims may be drafted to exclude any optional element. As such, this statement is intended to serve as antecedent basis for use of such exclusive terminology as "solely," "only," or "lacking" and the like in connection with the recitation of claim elements, or use of a "negative" limitation.

Unless defined otherwise below, all technical and scientific terms used herein have the same meaning as commonly understood by one of ordinary skill in the art to which this invention belongs. Still, certain elements may be defined herein for the sake of clarity, possibly providing an alternate meaning.

Turning now to FIGS. 1A and 1B, bistable operation of a micromechanical light modulator 2 is shown. The device comprises a mirror portion 4, a hinge portion 6 and electrode portions 8 set upon a substrate 10.

In FIG. 1A, the mirror is shown rotated or flexed about a hinge portion 6 in a clockwise direction from a horizontal position. The hinge is configured to provide a mechanical restoring force in returning from mirror rotation. Mirror rotation occurs as a result of electrostatic attraction between at least the mirror portion 4 and an electrode portion 8 of the device located above a substrate 10 which carries each of the elements.

Thus attracted, the mirror is pinned at a stable, minimum potential energy state. FIG. 1B shows the mirror deflected to a second minimum potential energy state opposite a second electrode. Operation of a micromirror device mirror between two such full-angle states represents what is referred to as "bistable" operation. Such operation is employed in a digital mode.

Digital operation sometimes involves employing a relatively large address voltage to ensure the mirror is fully deflected. Address electrodes are driven by underlying logic circuitry. A bias voltage, usually a positive voltage, is typically applied to the mirror metal layer to control the voltage difference between the address electrodes and the mirrors. Setting the mirror bias voltage above what is termed the "threshold voltage" of the device ensures the mirror will fully deflect toward the address electrode, even in the absence of an address voltage. Where a large bias voltage is employed, lower address voltages may be used since the address voltages need only cross a meta-stable point to enter an opposite bi-stable minimum potential energy state.

Micromirror devices may also be operated in analog mode. Sometimes referred to as "beam steering," this operation involves charging address electrode(s) to a voltage corresponding to the desired deflection of the mirror. Light striking the micromirror device is reflected by the mirror at an angle determined by the deflection of the mirror. A ray of light reflected by an individual mirror is directed to fall outside the aperture of a projection lens, partially within the aperture, or completely within the aperture of the lens, depending on the voltage applied to the address electrode(s). The reflected light is focused by the lens system onto an image plane. Each individual mirror pixel corresponds to a pixel on the image plane. As the ray of reflected light is moved from completely within the aperture to completely outside the aperture, the image location corresponding to the mirror dims, creating continuous brightness levels.

Note also, that both digital and analog micromirror device operation is applicable in the context of such devices used for optical switching applications. That is to say, micromirror devices (especially those produced according to the present invention) lend themselves to directing light from one path to another to optically connect and disconnect pathways as desired.

Figure 2:
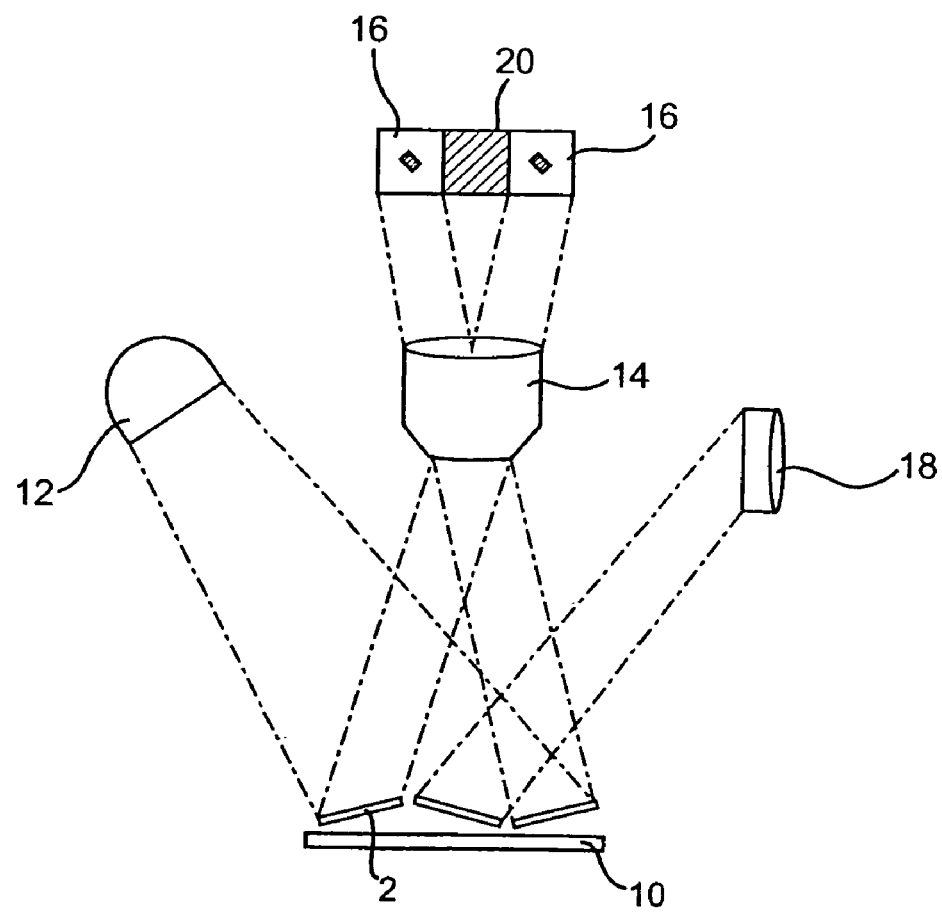

Yet, for the sake of discussion in introducing aspects of the invention in contrast to known designs, FIG. 2 illustrates an approach to producing images in a digital mode of micromirror device operation. Incident light from a light source 12 striking a mirror 2 rotated toward the light source is reflected to pass through a lens 14 and be displayed as a corresponding bright pixel 16 on a screen or the like (turned upward relative to the other components shown for ease of viewing). In contrast, mirrors rotated away from the light source reflect light away from the projection lens into a light trap 18 leaving a corresponding dark pixel 20 at the projection image surface. Mirrors rotated to produce a bright pixel may be regarded as "on," while those positioned to leave a pixel dark may be regarded as "off."

Figure 3:
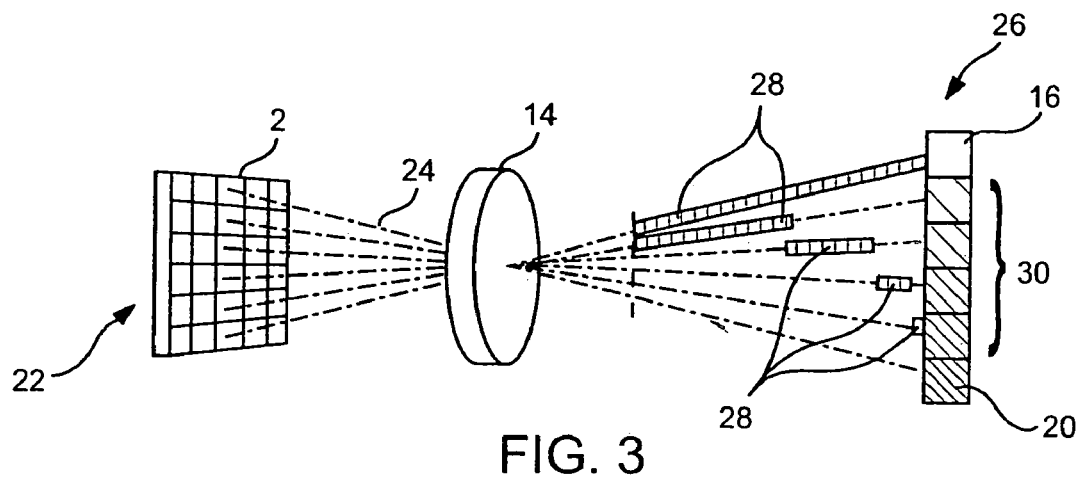

FIG. 3 illustrates a manner in which intermediate pixel brightness may be obtained. Digital mode micromirrors employ pulse width modulation techniques to rapidly rotate a mirror on and off to vary the quantity of light reaching the image plane. The human eye integrates the light pulses and the brain perceives a flicker-free intermediate brightness level. In FIG. 3, an active row of micromechanical light modulator elements 2 are depicted, forming a portion of a larger array 22. Directional markers 24 indicate the location of corresponding pixels within a projected pixel row 26 opposite a lens 14. A full-intensity bright pixel 16 is displayed by constant application of light rays 28. A dark pixel 20 is provided by leaving the corresponding reflective element 2 "off" so that essentially no light reaches the projection target. Pixels of intermediate intensity 30 are provided by application of intermediate lighted intervals by turning "on" and "off" the corresponding micromirror element 2.

Figure 4:
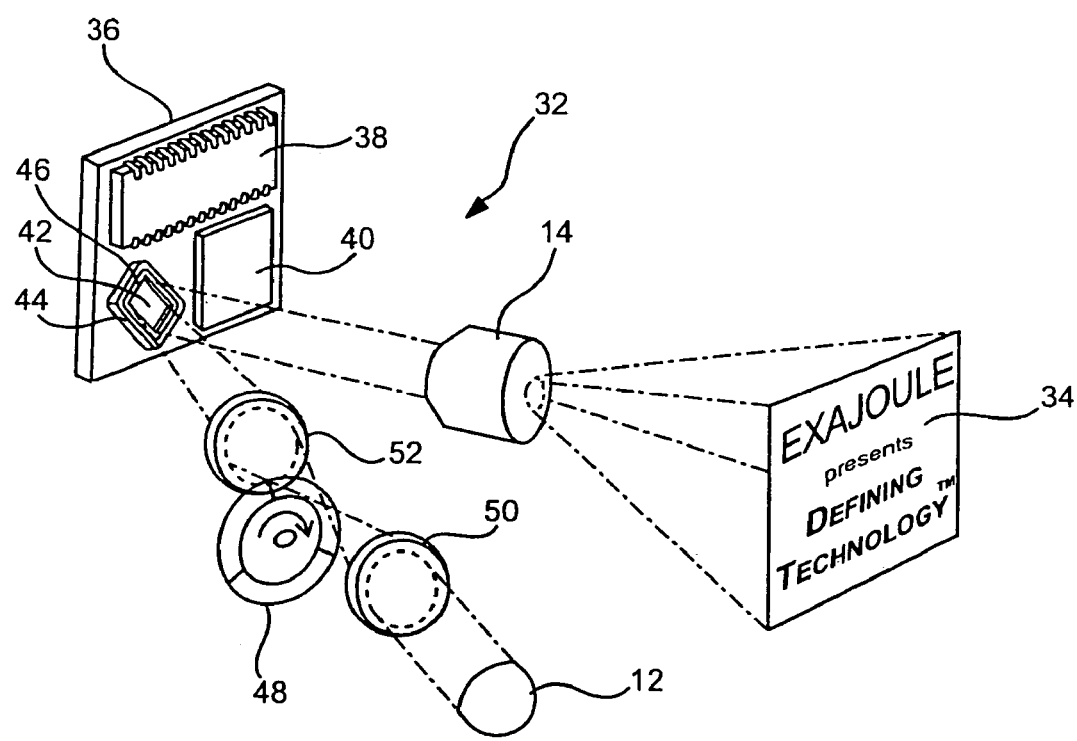

FIG. 4 shows a digital projection subsystem 32 in which the digital operation principle(s) discussed above are applied to project a cogent image on a screen 34. The subsystem includes a light source 12 and a projection lens 14 as well as a board or module 36 including a processor 38, memory 40 and micromirror array 42 comprising light modulating elements 2. The micromirror device shown is "packaged" in that the MEMS portion micromirror array 22 element of the device is set within a housing 44 sealed by a window 46.

These components alone, perhaps with intermediate optics to shape the light emanating from source 12, would be sufficient to present a gray-scale or "black and white" image. Additional components in the form of a color filter or "color wheel" 48 and optics for use therewith including a condensing lens 50 and a shaping lens 52 to focus and restore a columnar light beam through colored sections of the lens as its rotates are provided. Through coordinated rotation on the wheel and actuation of the micromirror elements 2, full color synthesis is possible.

Full-color images are generated by sequentially forming three single-color images. This process in concert with the former discussion of analog or digital methods of grayscaling gives many levels of shading of each color. The viewer perceives a single, full color image from the sum of the three single-color grayscaled images.

In addition to color wheel approaches, others are known. In accordance with known techniques, dedicated one-color or filtered light sources may be provided instead of a color wheel, especially utilizing a plurality of micromirror devices. Alternately, a color wheel may continue to be utilized with a plurality of micromirror devices in conjunction with a color separating prism (not shown). Still further, a plurality of micromirror devices may be provided and used in conjunction with a light source, no color wheel, but with color filtering prisms.

The choice of optics may vary. Providing additional light sources and/or additional micromirror arrays allows for image creation through superposition offering the potential for greater brightness and resolution. Simply providing dedicated light sources for a single micromirror array may improve brightness as well. One limitation to current micromirror device implemented solutions involves brightness levels. Since there is a practical limit to the brightness of a single source, one solution to this malady is to utilize multiple light sources. Factors of greater cost/system complexity will typically be weighed in determining whether to implement these improvements in a given system.

Figure 5A:
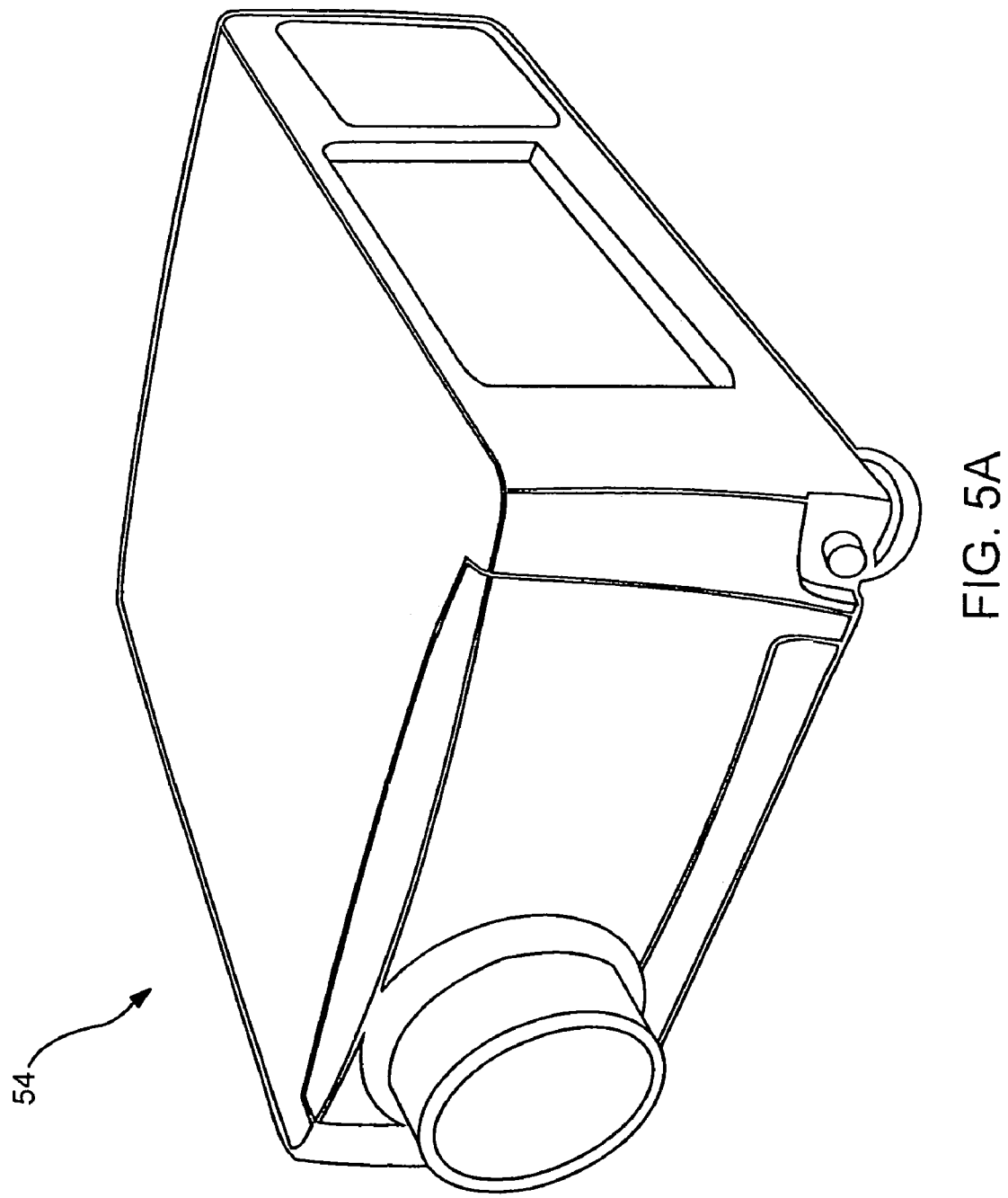
FIG. 5A is a perspective view of a micromirror device based projector.
Figure 5B:
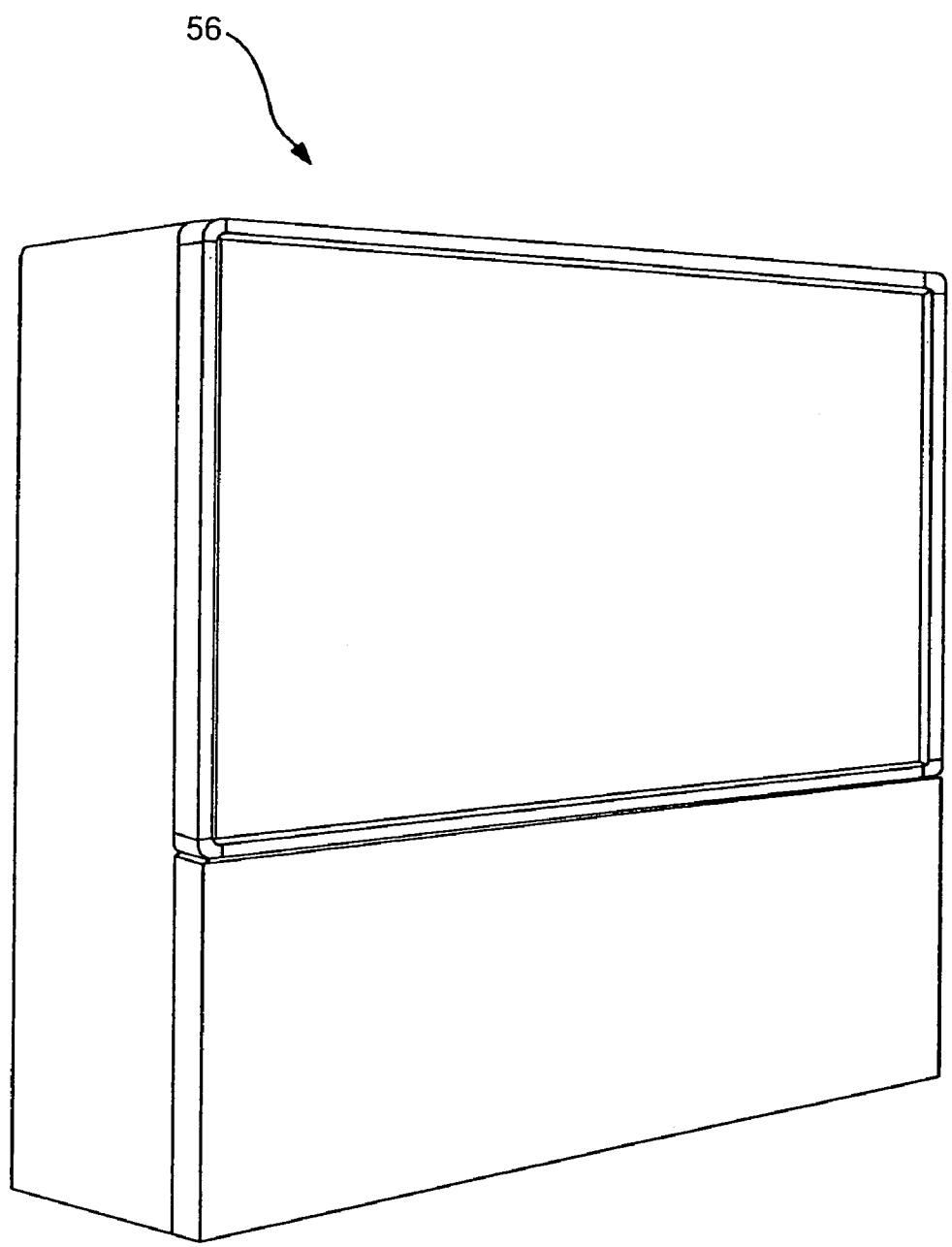
FIG. 5B is a perspective view of a micromirror device based projection television.

Regardless of the ultimate configuration selected, one of two media formats is preferably employed with the micromirror devices, though others are possible. These are illustrated in FIGS. 5A and 5B. The first figure depicts a projector 54. The projector shown is suitable for the typical consumer home-theater. Other devices that may incorporate systems according to the present invention may be suitable for larger venues (i.e., staging events and cinema presentations), being configured for high light output and waste heat generation. The second figure depicts a projection television 56. The television pictured is a rear projection system, though other styles (e.g., front projection) may be employed.

Whatever the case, such systems may be specifically designed for or designed around micromirror devices according to the present invention. Alternately, it is contemplated that a packaged "light engine" according to the present invention could be substituted into existing systems (with or without further modification or substituting the entire module 36) to upgrade performance.

Figure 6:
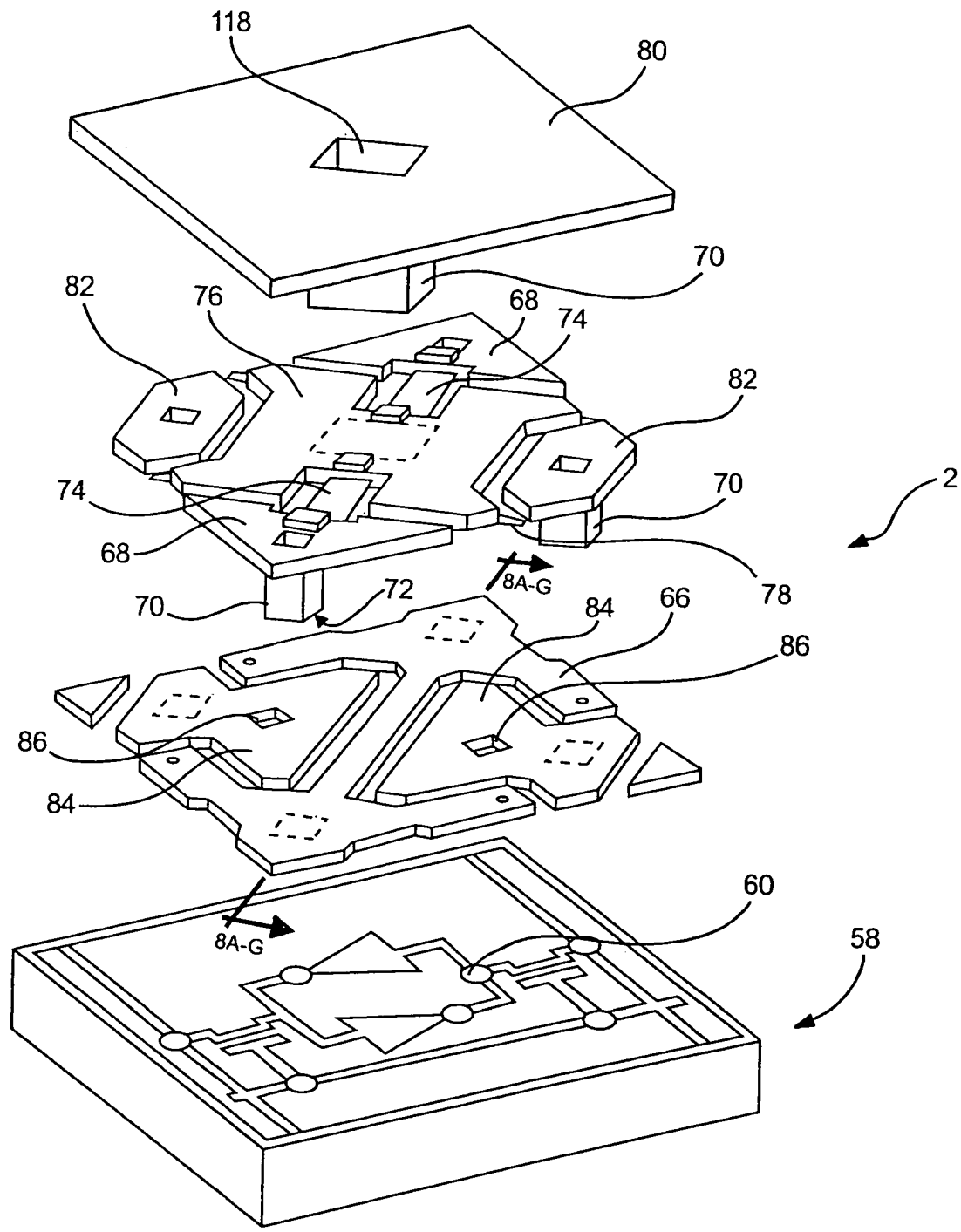

To appreciate the performance advantages available through various aspects of the present invention, it is important to first appreciate the structure of the above-referenced Texas Instruments devices that are believed to define the state of the art at the time of filing. FIG. 6 shows a single mirror element 2 of an array in an exploded perspective view.

Figure 7:
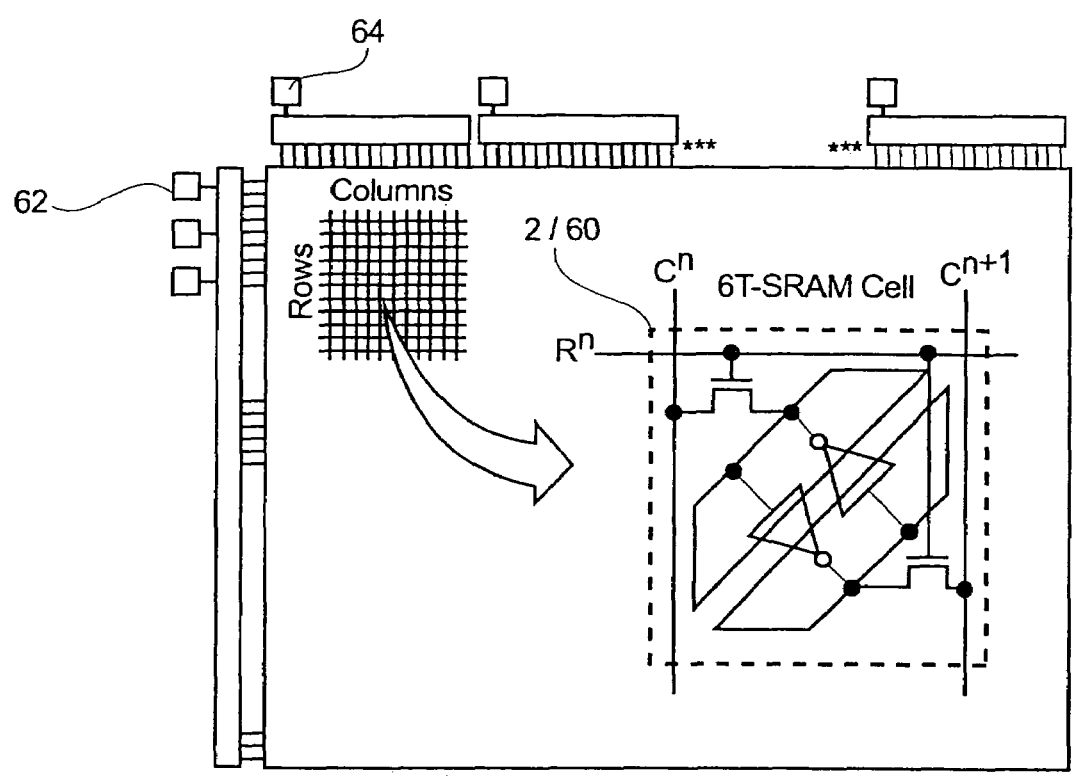

Several levels of structure are expressed. The bottom level is a semiconductor substrate 58 with electrode addressing circuitry 60 provided thereon. The manner in which such circuitry is addressed (whether as provided in the referenced micromirror devices or those according to the present invention) is illustrated in FIG. 7. For the various rows and columns of micromirror elements 2, addressing architecture is shown that incorporates N addressing inputs 62 for every 2 N rows and 1 data input 64 for every 16 columns. Such substrate material in various configurations, with a passivation layer including vias to provide connectivity at selected locations/spacing is commercially available.

Returning to FIG. 6, the physical alignment of superstructure components above the address circuitry is such that, upon selection, address voltage is applied to the electrodes of the device. The bias voltage discussed above is applied to the mirror by way of intermediate structures connected to a bias/reset bus 66 provided upon substrate 58.

Hinge supports 68 are set above the bias bus, and supported above bus 66 by substantially square, columnar via-based supports 70. (The final alignment of these components and others is indicated in dashed lines.) The support posts are produced by deposition within a hole provided within a sacrificial layer of material in an intermediate stage of device production. Accordingly, they are not solid, but rather hollow until the solid base portion 72, with a closed outer wall or periphery. The hinge supports are attached to hinge segments or portions 74 which are in-turn attached to a yoke 76. The corners of the yoke are provided with spring tips 78. The spring tips provide bumpers to cushion or moderate contact between the yoke and bias bus upon full mirror actuation, rather than having to precisely control voltages or rely on other interfering contact. While potentially useful, it is contemplated that micromirror devices according to the present invention may or may not make use such features.

Above the yoke, micromirror element 2 includes a mirror 80. The mirror is connected to the yoke by way of a via-type support 70 like those provided for the hinge supports, leaving a hole 118 in the mirror face. By way of the connecting structures, each of the mirror, yoke, hinges and hinge supports are charged to the bias voltage of bus 66.

To actuate the device, a voltage is applied to the electrodes 82 and 84 that electrostatically attract both the mirror and yoke, respectively. The electrodes are set at two levels. The higher-up outer electrode portions 82 are electrically connected to the lower electrode portions 84 by way of another connecting columnar via 70. This combination of elements is placed in electrical contact with the addressing circuitry by a filled-in via 86 in the base of each electrode portion 84. The upper electrodes are positioned to attract the mirror, whereas the lower electrodes are positioned to attract the yoke.

The manner of producing the superstructure of micromirror device 2 is represented in FIGS. 8A-8H. The stages shown are indicative of action taken after intermediate masking steps between material deposition (sacrificial material or structural material) and sacrificial material removal. To most clearly portray the structure being produced, the perspective view shown takes the device across the sectional line shown in FIG. 6 and tilts the structure.

Figure 8A:
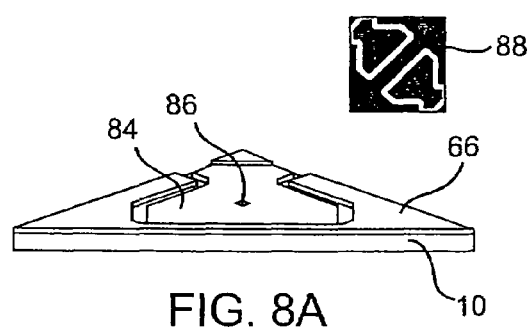

In FIG. 8A, a portion of bus 66 and a lower electrode 84 are shown, formed by a conductive material. These are provided by material deposited over substrate 10, with the overlaid material strategically etched away. The raised portions will have been covered by a protection layer, configured using a first mask 88 (diagrammatically pictured). The substrate comprises the addressing circuitry covered by a passivation layer, the layer having holes strategically placed to provide access vias to the underlying circuitry. The vias are filled-in to provide electrical connections 86 between the substrate and electrodes as noted above with respect to FIG. 6.

Figure 8B:
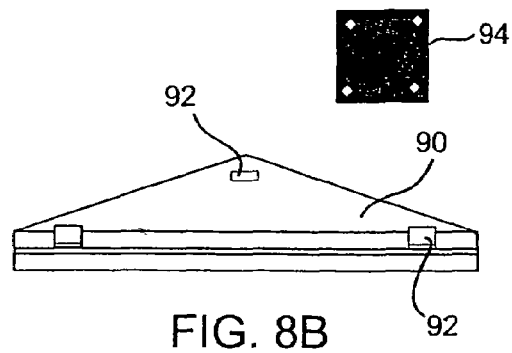

FIG. 8B shows a layer of sacrificial material 90, deposited over the structure in FIG. 8A. Via column holes 92 are provided, again by selectively etching the material in connection with a second mask 94.

Figure 8C:
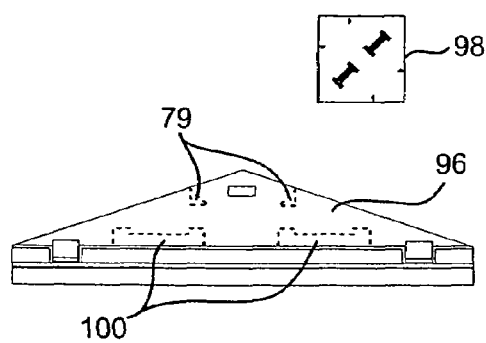

In FIG. 8C another layer of conductive material 96 suitable for use in producing hinge sections 74 and spring tips 78 is laid-down. Following this, a third mask 98 is employed in setting a protective layer such as an oxide (not shown) over the regions of layer 96 serving as hinge precursors 100, and spring tip precursors 79.

Figure 8D:
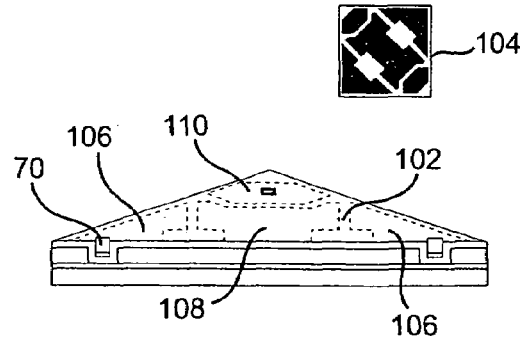

In FIG. 8D, another layer of conductive material 102 is deposited thereon. A fourth mask 104 is utilized to form a protective layer (not shown) over the regions of layer 102 serving as hinge support precursors 106, a beam or yoke precursor 108 and upper electrode precursor(s) 110.

Figure 8E:
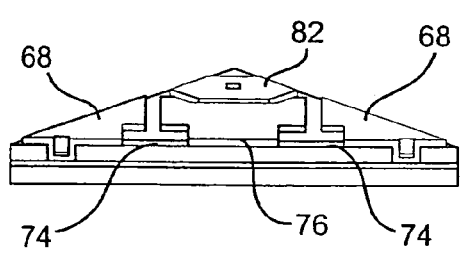

Both the hinge metal layer 96 and yoke/electrode metal layer 102 fill via holes 92, providing columnar support portions 70. The portions of the material layers not protected during processes involving the third and fourth masks are selectively etched as shown in FIG. 8E to define hinge supports 68, hinges 74, yoke 76 and upper electrode portions 82.

Figure 8F:
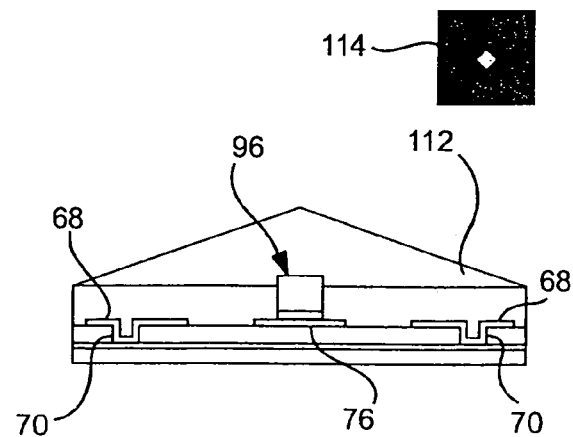
Figure 8G:
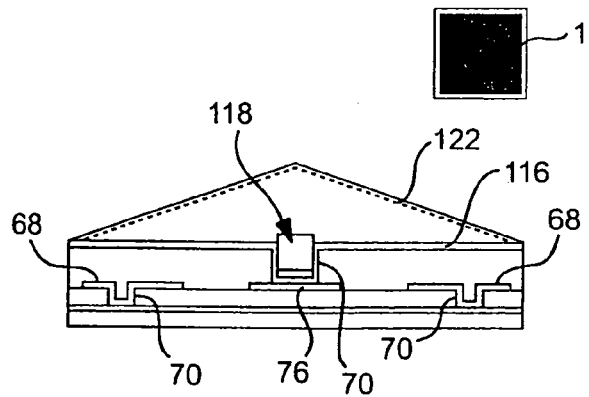
Figure 8H:
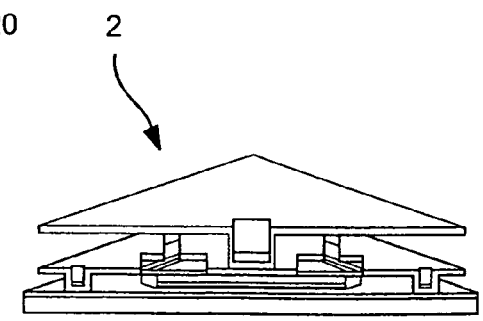

FIG. 8F shows the micromirror device in another intermediate stage of production with another layer of sacrificial material 112. This layer is deposited over the structure in FIG. 8E. It includes a via column hole 96, patterned utilizing a fifth mask 114. When a mirror material layer 116 is deposited over sacrificial layer 112 as shown in FIG. 8G, via hole 96 is partially filled in, providing support column 70, but leaving a hole or opening 118 in what is to become the "face" of the mirror element. Following a deposited metal oxide layer (not shown), a sixth and final mask 120 is used to pattern and define a mirror precursor region 122 and adjacent borders indicated by dashed lines, the latter being removed to form spaces between adjacent mirrors 80 in a complete micromirror array. Finally, FIG. 8H shows the micromirror element 2 as completed, with all sacrificial material removed to release the structure.

The details of the materials employed, intermediate preparation steps and further constructional details associated with the methodology described are known by those with skill in the art, within the scope of reasonable. experimentation by the same and/or may be appreciated by reference to background noted above or the following U.S. patents: U.S. Pat. No. 5,083,857 to Hornbeck, entitled "Multi-level Deformable Mirror Device"; U.S. Pat. No. 5,096,279 to Hornbeck, et al., entitled "Spatial Light Modulator and Method"; U.S. Pat. No. 5,212,582 to Nelson, entitled "Electrostatically Controlled Beam Steering Device and Method"; U.S. Pat. No. 5,535,047 to Hornbeck, entitled "Active Yoke Hidden Hinge Digital Micromirror Device"; U.S. Pat. No. 5,583,688 to Hornbeck, entitled "Multi-level Digital Micromirror Device"; U.S. Pat. No. 5,600,383 to Hornbeck, entitled "Multi-level Deformable Mirror Device with Torsion Hinges Placed in a layer Different From the Torsion Beam Layer"; U.S. Pat. No. 5,835,256 to Huibers, entitled "Reflective spatial Light Modulator with Encapsulated Micro-Mechanical Element"; U.S. Pat. No. 6,028,689 to Michalicek, et al., entitled "Multi-Motion Micromirror"; U.S. Pat. No. 6,028,690 to Carter, et al., entitled "Reduced Micromirror Mirror Gaps for Improved Contrast Ratio"; U.S. Pat. No. 6,323,982 to Hornbeck, entitled "Yield Superstructure for Digital Micromirror Device"; U.S. Pat. No. 6,337,760 to Huibers, entitled: "Encapsulated Multi-Directional Light Beam Steering Device"; U.S. Pat. No. 6,6,348,907 to Wood, entitled "Display Apparatus with Digital Micromirror Device"; U.S. Pat. No. 6,356,378 to Huibers, entitled "Double Substrate Reflective Spatial Light Modulator"; U.S. Pat. No. 6,369,931 to Funk, et al, entitled "Method for Manufacturing a Micromechanical Device"; U.S. Pat. No. 6,388,661 to Richards, entitled "Monochrome and Color Digital Display System and Methods"; U.S. Pat. No. 6,396,619 to Huibers, et al., entitled "Deflectable Spatial Light Modulator Having Stopping Mechanisms". In any case, micromirror devices according to the present invention may be produced and/or operated according to the same details or otherwise.

Figure 9A:
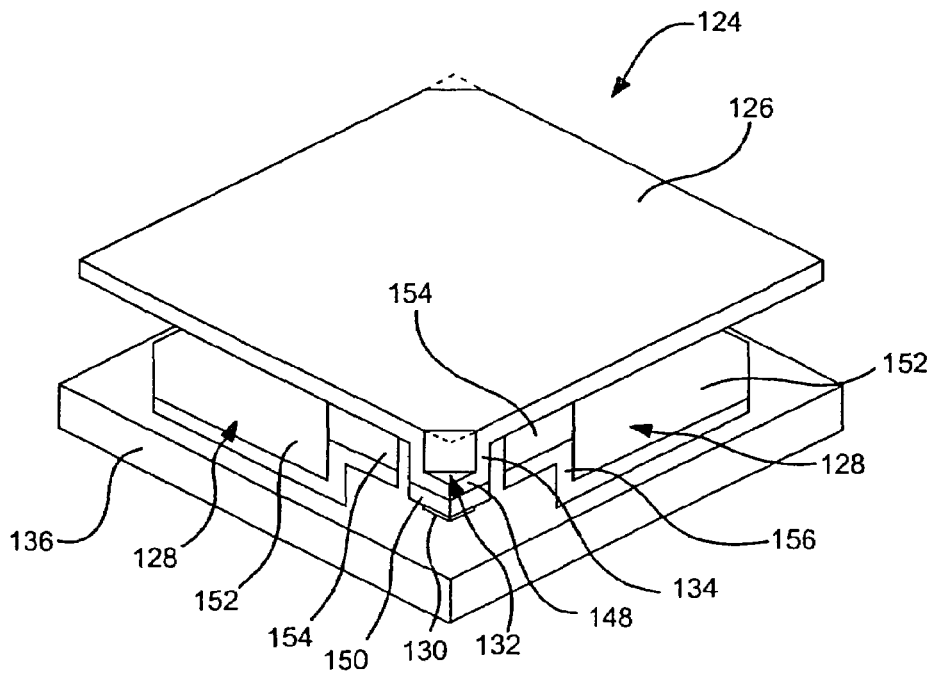
Figure 9B:
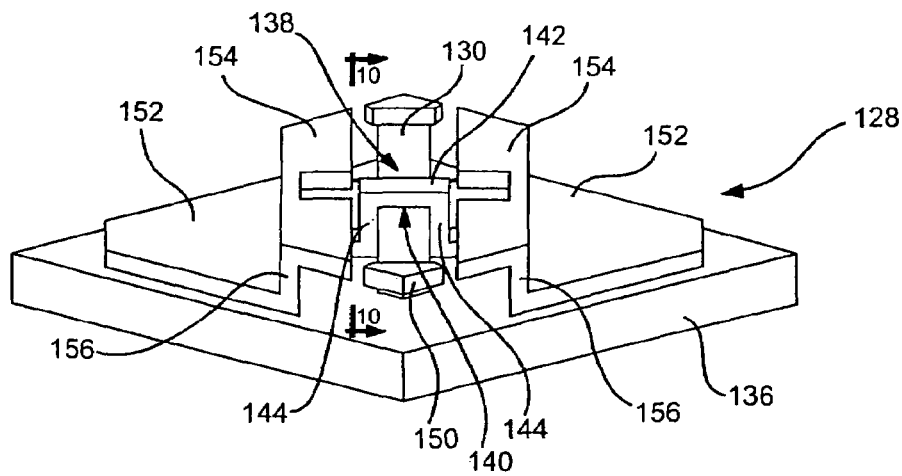
FIG. 9B shows the element in FIG. 9A without a mirror.
Figure 9C:
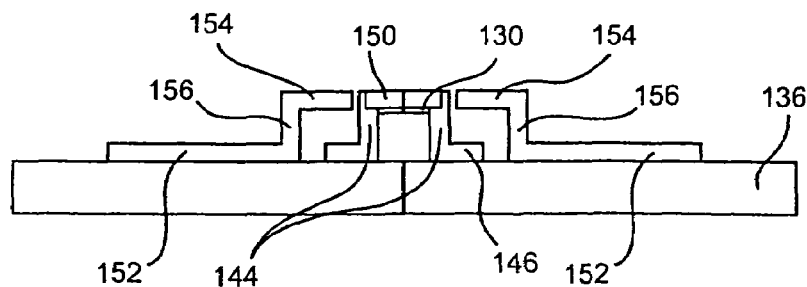
FIG. 9C shows the element of FIG. 9A from the side.
Figure 9A:
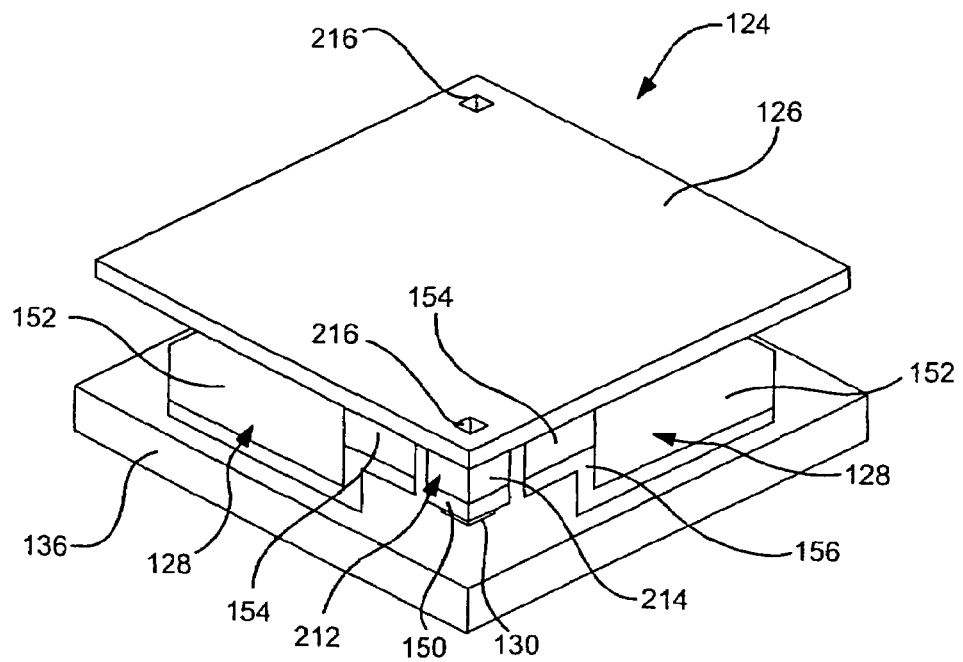
Figure 9B:
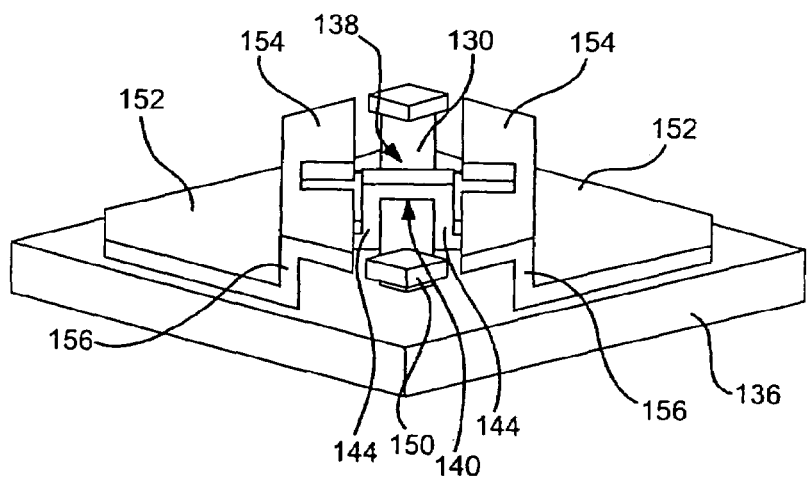
Figure 9C:
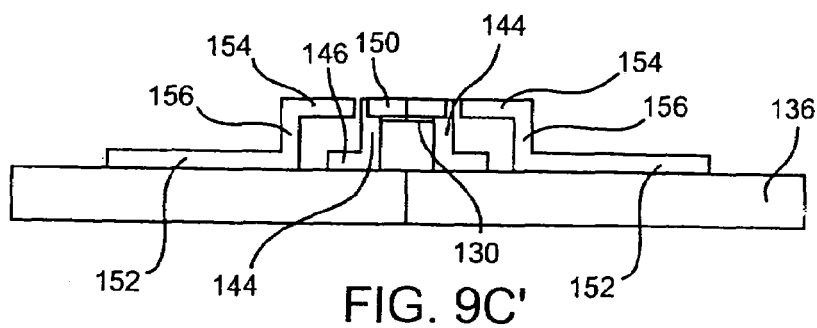

Regarding the features of the present invention, FIG. 9A shows a preferred micromirror element 124 per the invention. The variation of the invention shown includes each of the optional features that may be employed, though not all such features need be provided in a given product. FIG. 9B shows the micromirror device 124 in FIG. 9A minus its mirror. FIG. 9C shows the same from the side.

Optional features of the invention that may be employed together or individually break down into three basic groups. A first group concerns supporting a mirror portion 126 at its sides; a second group concerns providing electrodes 128 adapted for sequential attraction of the mirror; and a third group concerns supporting various components including the mirror, electrode portions and/or hinge portions 130 with open support structures. These features are addressed variously in the following description.

The mirror shown in FIG. 9A has an uninterrupted "face" in that its reflective surface is unbroken as compared to device 2 of FIGS. 6 and 8. While the "potential face" or "prospective face" of the mirror (indicated by solid and dashed lines together) may be somewhat larger than the actual face of the mirror (the area indicated by solid lines alone), "dim" or "dead" space 132 resulting, generally, in light scattering may be reduced. As described below, such space may be minimized or even eliminated according to an aspect of the present invention.

First, general features of element 124 under the mirror are described. One such aspect concerns the manner in which mirror 126 is attached to its hinge. Supports 134 on opposite sides of mirror element 126 secure it to hinge portions 130. The hinge portions may comprise individual segments, or may be part of a unitary structure. In any case, the hinge defined is attached to substrate 136 by a bridge-type support 138. The support is preferably open underneath the hinge center 140, which is attached to a spanning segment 142 between vertical support segments 144. Feet 146 may additionally be provided to stabilize the support structure. Yet another option is to produce support segments 144 at an angle relative to the surface of the substrate (i.e., having both vertical and horizontal components).

Likewise, support 134 may be set at an angle with respect to the substrate. Yet, it is more preferable that support(s) be provided orthogonally as shown. A base 148 of each support 134 may directly connect each hinge portion 130. However, it may be preferred that an intermediate layer or nub 150 of material (e.g., serving as a bonding interface) is employed.

In any case, the device is configured so that the hinge is set some distance (as little as about 0.1 micron, or less) above the surface of substrate 136 and mirror 126 is set some distance (as little as about 0.1 micron, or less) above the hinges (as little as about 0.2 micron, or less, above the surface of substrate 136). Avoidance of a yoke allows creation of very low profile micromirror devices by the invention that are still able to attain high deflection angles (typically about .+-.10 deg., even upwards of about .+-.15 deg., to about .+-.20 deg. or more). Of course, mirror/micromirror devices according to the present invention may be advantageously manufactured on a larger scale (even using MEMS techniques)—possibly utilizing other actuation techniques, including electromagnetic, electromechanical, thermo-mechanical or piezo-based approaches—especially for non-projection technology.

An aspect of the invention that facilitates provision of adequate electrostatic attraction in response to hinge restoring forces that increase with angular deflection has to do with the configuration of electrodes 128. The electrodes may be configured with a plurality of portions 152 and 154 (or more) at different levels. Whether provided in a series of steps by continuous members (as shown with a support portion 156 between each stage 152/154), by steps formed with discrete members or a continuous angled member, the electrodes are configured so that portions further from the center or point of rotation of the mirror are at a lower level.

The electrode configuration shown with higher portions closer to the center and lower portions more distant provides clearance for the mirror as it is tilted at an angle. Furthermore, the configuration provides for sequential attraction of mirror 126. When the mirror is angled away from a set of electrodes, the upper electrode portion is the first to exert significant attractive electrostatic force on the mirror (in light of the inverse squared relationship between electrostatic attraction and distance between objects). As the upper electrode portion (s) effectively attract the mirror drawing inward, the influence of the electrode lower portion(s) increase. Further aiding attraction of the mirror to its full angular displacement is the increased mechanical advantage or lever arm offered at more remote regions of the mirror interacting with lower electrode portion 152.

The manner in which a micromirror device 124 according to the present invention may be produced is illustrated in FIGS. 10A-10G. Of course, the process steps employed will vary depending on which inventive features are actually employed in a given variation of the invention. But again, a most preferred approach is shown.

Figure 10A:
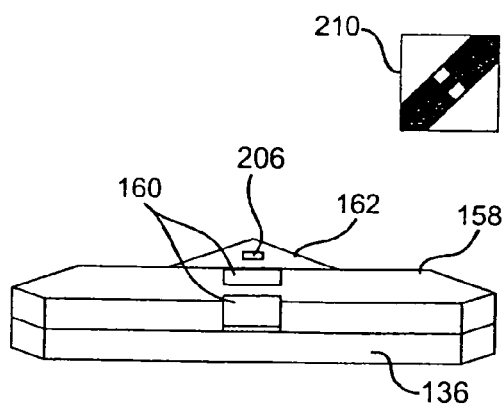
FIGS. 10A-10G are perspective views showing the micromirror element(s) of FIGS. 9A-9C at various stages of production.
Figure 10B:
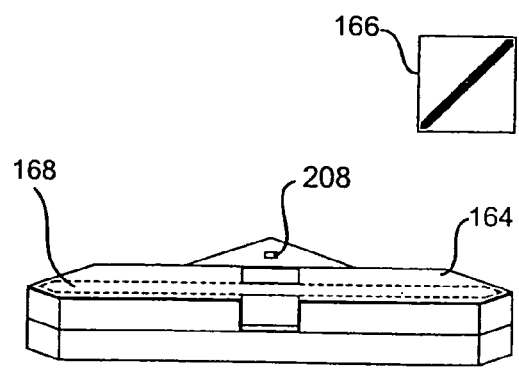

In FIG. 10A, a sacrificial layer of material 158 is set upon substrate 136. It is patterned with a first mask 210 to define openings 160 and a substrate-level portion 162 upon etching. In FIG. 10B, a hinge metal layer 164 is deposited over the entire surface including a portion of the sacrificial layer. A second mask 166 is utilized in defining a passivation layer (not shown) over the region(s) of layer 164 serving as a hinge precursor region 168. Metal layer 164 fills in via 206 provided in substrate 136 to form a connection 208 between underlying address circuitry beneath an oxide layer of the substrate. The same approach to addressing and substrate construction may be employed as described above, or another manner of electrical control of device superstructure produced may be utilized. This holds true with respect to connectivity between the device elements as well as the configuration of substrate 136.

Figure 10C:
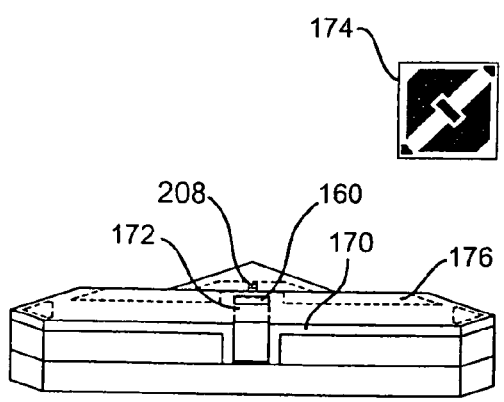

As shown in FIG. 10C, a thicker layer of conductive material 170 is deposited over the hinge material. This layer builds-up the electrodes 128 and further fills openings 160, defining a support precursor region 172 for hinge portions 130. Layer 170 also further fills in via 206 and connecting structure 208. A third mask 174 is employed to define a protective layer (not shown) over the region of layer 170 serving as electrode precursor(s) 176.

Figure 10D:
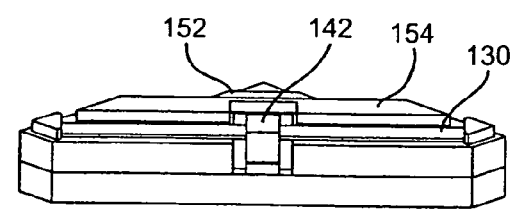
Figure 10E:
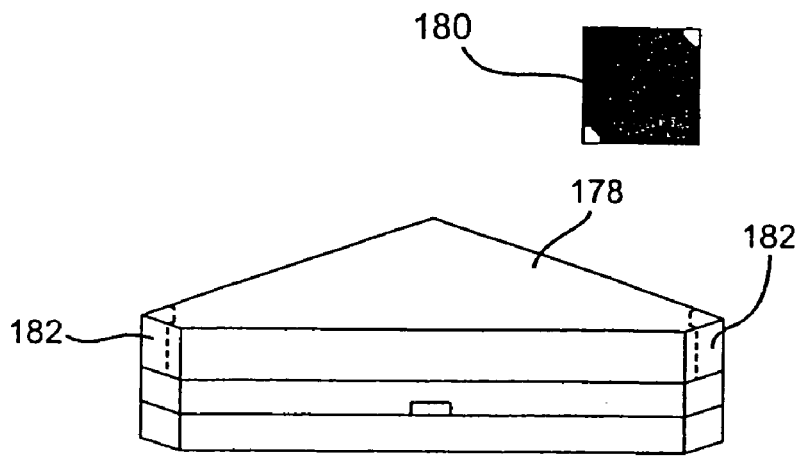

In FIG. 10D, layers 164 and 170 are shown selectively etched to reveal hinge 130, support spanner 142, and electrode portions 152 and 154. As shown in FIG. 10E, these structures are then covered by another sacrificial layer 178. A fourth mask 180 is used to pattern sacrificial layer 178 to form support precursor regions 182 upon etching the sacrificial layer.

Figure 10F:
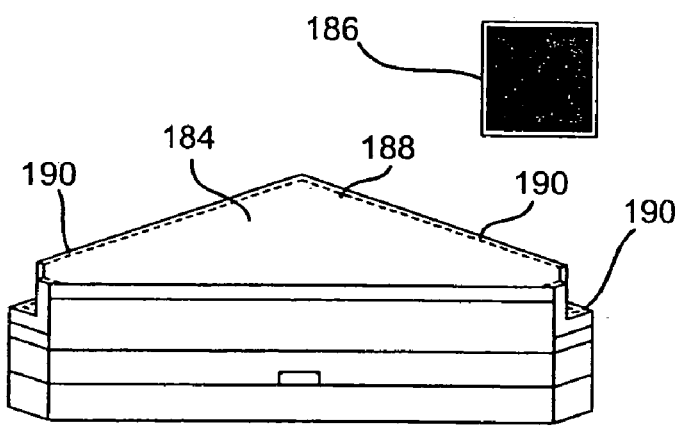

FIG. 10F shows sacrificial layer 178 as it is selectively etched, and then coated with a layer 184 of conductive material suitable to serve as a mirror (or a substrate that may be subsequently coated with a highly reflective metal or dielectric material). A fifth mask 186 is used in order to define a passivation layer over mirror precursor regions 188 to be retained, but not the adjacent borders 190, which are removed to form spaces between adjacent micromirrors 126.

Figure 10G:
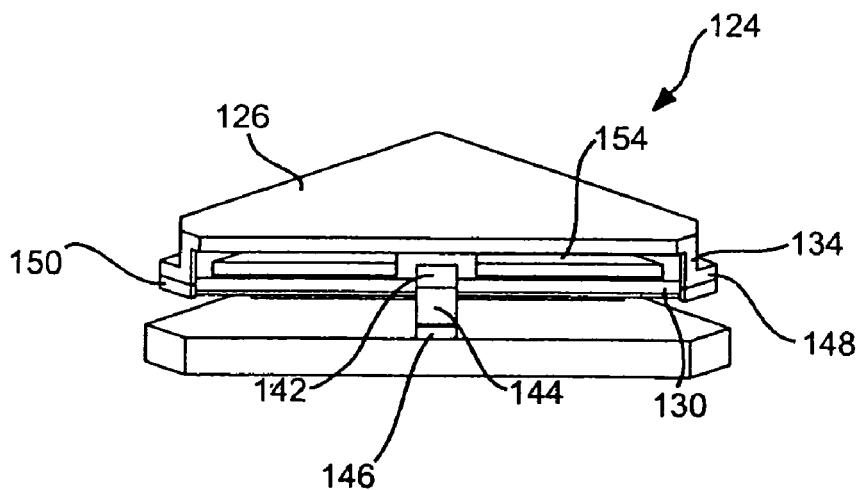

FIG. 10G shows a micromirror element 124 according to aspects of the invention after all sacrificial materials have been removed. As discussed above, the mirror is supported at or along its opposite sides or edges by supports attached to a hinge, which is in turn supported above the device substrate. In addition to being placed at opposite sides/portions of the mirror, the support members may be characterized as being "open" in nature. Progressive or dual-stage electrodes are shown as well.

It is further noteworthy that a micromirror device produced according to the methodology described merely requires 5 masks—i.e., as constructed on a pre-fabricated substrate. In contrast, the Texas Instruments DMD™ is produced using 6 masks under the same conditions. Thus, the methodology according to the present invention is highly advantageous from both fabrication cost and device yield standpoints.

Still, a micromirror device according to the present can be produced with the same pixel dimensions as known devices. In doing so, a device according to the present invention will offer a performance benefits at least in terms of light return. Reasons for this advance are discussed below.

Figure 11A:
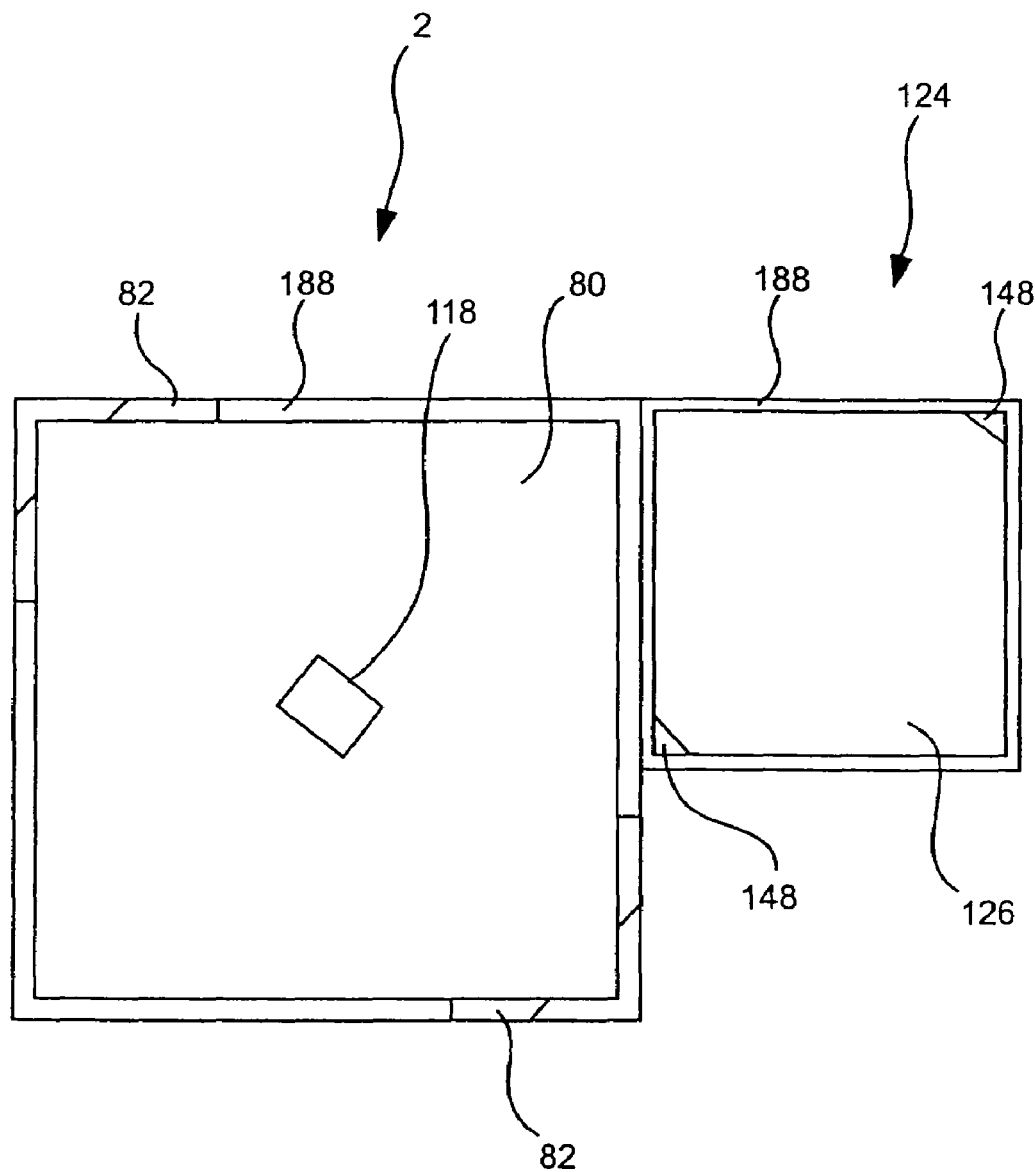
FIGS. 11A and 11B compare micromirror devices according the present invention against the device shown in the referenced figures. Certain aspects of the figures diagrammatically represent the present invention, while others are indicative of preferred relations. Regardless, variation of the invention from what is shown in the figures is contemplated.
Figure 11B:
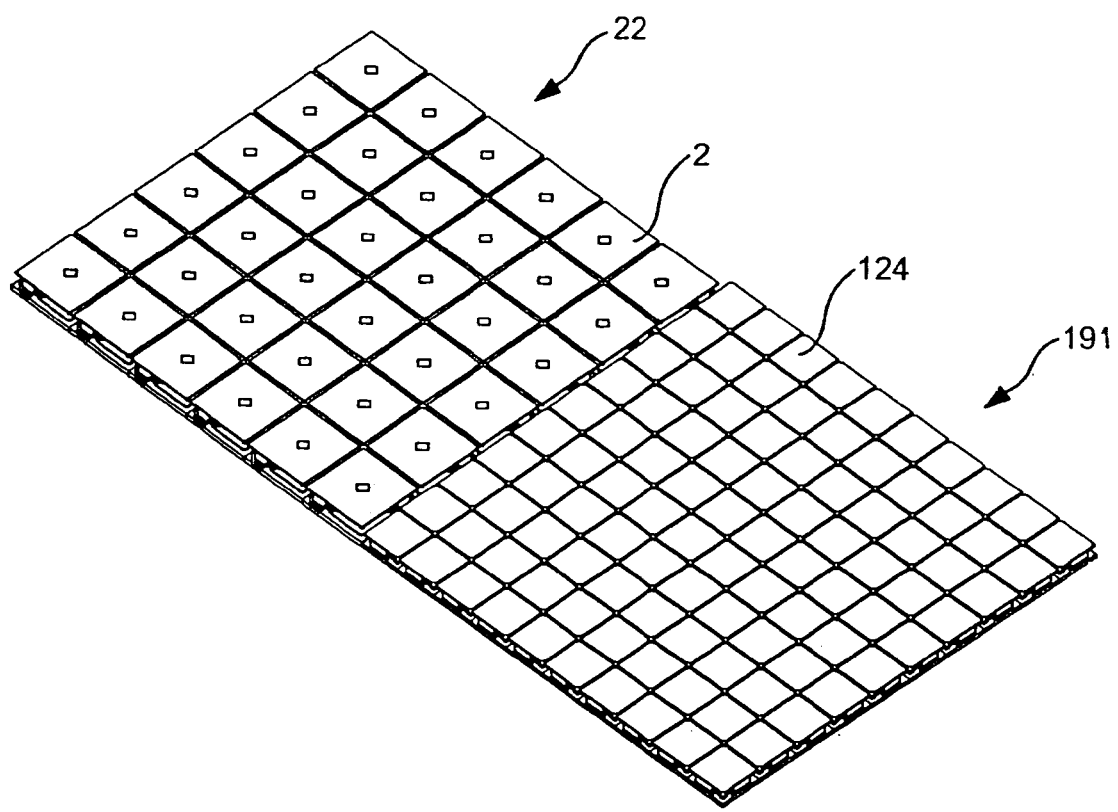

Before such discussion, it is helpful to first consider a side-by-side comparison of micromirror elements as provided in FIGS. 11A and 11B. A Texas Instruments DMD™ element 2 is shown from above on the left with a micromirror device 124 according to the present invention next to it. The size differences between the two are immediately apparent. Using present techniques, micromirror devices according to certain aspects of the present invention may be made smaller than the referenced devices by between about 25% and about 65% or more (i.e., devices according to the present invention may be about 75% to about 35% of the size of known devices) due the absence of a yoke layer in order to allow for a smaller sacrificial layer gap—while still employing a plurality of electrode levels.

Reduction of the support footprint (pixel size) allows for a smaller mirror with the same hinge length. The reduced sacrificial layer gap allows for overall thinner structure, which reduces the horizontal pivoting space necessary to deflect a mirror, thus reducing the gap necessary between adjacent mirrors.

Generally, mirrors elements employed in the present invention can be made smaller than DMD-sized mirrors that have roughly a 19 micron diameter. Mirrors/pixel elements according to the present invention may advantageously be produced at less than about 10 microns in diameter. By "diameter," what is meant is the distance across any long axis that may be defined; stated otherwise, the diameter will correspond to that of any circle in which the structure can be circumscribed.

FIGS. 9A'-9C' show components of another device 124 constructed using a means or approach to mirror support somewhat different from that discussed above. Still, such devices may advantageously be selected for use in a micromirror device array and present many of the same benefits as elements constructed according to FIGS. 9A-9C. Yet, the micromirror device element shown in FIGS. 9A'-9C' may be desired from a manufacturing perspective, or for one or more other reasons depending on the circumstances.

The support configuration shown may be produced in connection with a modified version of the five-mask process described above, wherein differences in production methodology will be readily apparent to one with skill in the art. Basically, in this variation of the invention, columnar supports or posts 212 are utilized which may be created by filling in vias produced in sacrificial material. As in other variations of the invention pictured, each of the pair of supports is positioned opposite one another and across the body of mirror 126. Supports 212 are shown to have a wall 214 at the edge of mirror 126 (each may have four walls or more or may define curved surfaces—depending on the original via shape that is filled-in to create the structure). Yet, the supports may be inset from the side/corner or edge of a mirror (depending on the style of micromirror device chosen) to which they are closest. However, it may be preferred to position supports 212 in such a way as to maximize hinge or torsion member length in view of the mirror style/format selected (i.e., square with corner support positions, hexagonal with corner supported positions, hexagonal with side support positions, etc.). In which case, the base of each support (or an intermediate structure) will be positioned at the end of any hinge portions. However configured, supports 212 will generally be positioned outside of the hinge support member 138 or members.

FIGS. 9A"-9C" provide details of a hexagonal-shaped mirror supported at opposite corner positions. Its construction and appearance closely resemble the micromirror elements 124 shown in FIGS. 9A-9C. However, the hexagonal mirror format offers certain advantages in use. For one, they can be closely packed in a manner like a honeycomb, where sequential rows (or columns) overlap. Such overlap provides the ability in image creation to mimic higher resolution output where there is overlap. The principles of such operation are well documented and may be understood in reference to U.S. Pat. No. 6,232,936 to Gove, et al., entitled "DMD Architecture to Improve Horizontal Resolution". Further potential advantages associated with the mirror format shown in FIGS. 9A"-9C" are presented below.

Especially with respect to that shown in FIGS. 9A-9C and 9A"-9C" another immediately apparent distinction between the Texas Instruments device and those shown in the reference figures concerns what may be regarded as "dead" or "dim" space that is substantially non-reflective or poorly reflective relative to the mirror face(s). A large central hole 118 is present in mirror face 80 of the former structures. As shown in FIG. 2, this actually results in a central dark or missing region in each pixel image. By way of comparison, each mirror 126 in FIGS. 9A and 9A" is inviolate at the center. Any dim or dead space 132 associated with the prospective mirror face only involves the space above support base portions 148.

Figure 12A:
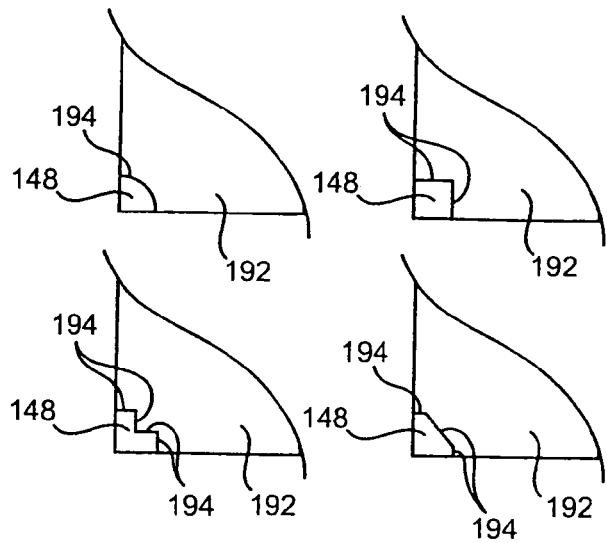
FIGS. 12A-12C show different mirror support configurations according to the present invention.
Figure 12C:
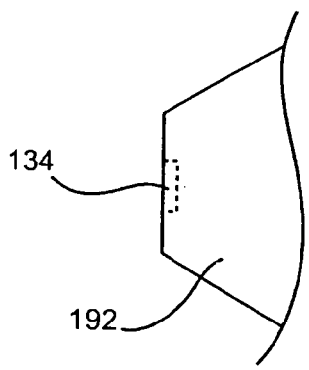
Figure 12B:
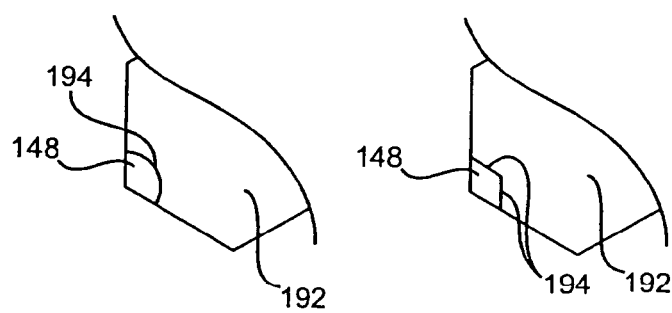

As alluded to above, however, depending on support configuration, this space may be minimized or even eliminated. Different support configurations are shown in FIGS. 12A, 12B and 12C. FIG. 12A show mirror sections 192 from above, the base 148 of each support member and wall portions 194 defining vertical sections(s) in connection with square mirrors. FIG. 12B shows configurations advantageously employed with hexagonal mirrors as indicated by identical reference numerals. As shown in FIG. 12C, base 148 may even be altogether eliminated, especially in mirror side-mount configurations. Here, a hexagonal mirror is portrayed in which support wall(s) 134 attach directly to the underlying structure without the addition of an extended base portion 148. Supports 134 are depicted in broken line because (as apparent in FIG. 9A) some thickness of the wall resides below the surface of mirror 126 as viewed from above.

Figure 13A:
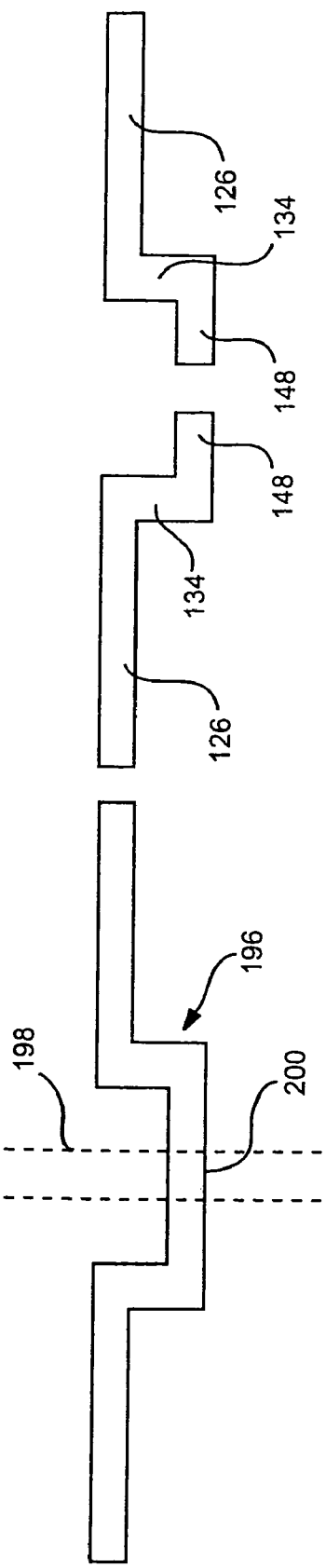
FIGS. 13A and 13B show optional manners of producing support portions with and without a base, respectively.
Figure 13B:
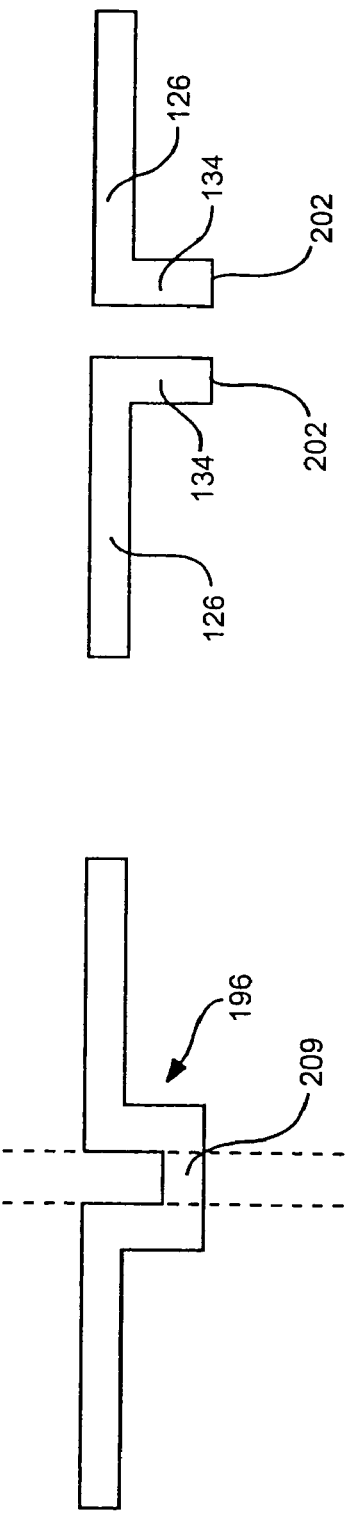

The manner in which producing support regions with no base is depicted in FIGS. 13A and 13B. In FIG. 13A a support precursor 196 is shown. It is etched-out as indicated by dashed lines 198 in accordance with the discussion above, removing region 200. The resulting, separated structures include support 134 and base 148 regions, with mirror regions 126 above. In FIG. 13B, the support precursor region is so small that removal of region 200 leaves no discrete base(s) 148, but only base surfaces 202 (attached to underlying structure).

In view of the different manner of supporting mirrors as offered by aspects of the present invention, it is possible to achieve a situation where between about 88% and about 100% of the prospective mirror face is utilized, and therefore comprises reflective surface. The limit for the known devices described herein is below 88%.

Though not offering these particular advantages, the variation of the invention shown in FIG. 9A' offers advantages relative to the Texas Instruments approach that includes a large, central hole 118 in each pixel. The dead or dim zones associated with mirror holes 216 as provided in mirror faces according to the present invention are spread apart from each other and of a combined area that is less than the Texas Instruments column support. Also, it is believed that this delocalization of such space will make its effects less apparent to a viewer. Decentralization of dim or dead space in the pixel may further diminish the ability of a viewer to pick-out the features upon close inspection.

However the supports are configured, as may be observed in FIGS. 11A and 11B, each micromirror element is surrounded by a border 188. This gap or border provides clearance for the mirrors as they tilt back and forth in an array. In the active regions of any micromirror array, this dead space cannot be eliminated. It can, however, be reduced by providing lower-profile micromirror assemblies. Highly-elevated mirrors as in the Texas Instruments DMD™ that are set above a yoke 76 and greatly separated from the underlying hinge and/or substrate require more lateral space in which to accomplish such angular deflection as desired than lower profile structures as may be achieved with the present invention. The ability to produce low-profile micromirror devices according to aspects of the present invention enables reducing overall gap or border space to less than in known micromirror devices, where gap space is believed to represent about 11.4% of the area in the active array region.

In certain instances reduction in gap size may be more significant than increasing use of prospective mirror face. For example, where shorter supports 134 are provided (or via hole 118 is more filled-in), partial light return can be expected. In which case, the zones are more "dim" than "dead" as to reflection.

Nevertheless, the array 22 comprising Texas Instruments micromirror devices as described is not capable of producing the resolution of array 191 using micromirror devices as may be produced according to the present invention. In roughly the same space, array 191 packs 100 light modulator elements as compared to 36 in array 22. The result of this difference nearly triples of the number of pixels that may be projected.

The increased pixel density allows for finer detail construction of an image. Furthermore, dim or dead zones are more diffuse—and smaller (by way of smaller gaps 188 and/or spaces 132 versus holes 118). Each factor contributes to making their effect less notable, just as they are more difficult to discern in FIG. 11B. The fact that the overall dead space is less, leads to overall greater image brightness versus known devices. The distribution of the dead space over a greater number of regions leads to greater apparent image quality. The human eye is highly attuned to pattern recognition. The dispersal of the "dead" or "dim" areas, reducing their concentration, counters this ability.

Provision of such a dramatically increased number of mirrors may, however, require certain accommodations. Considering that mirrors in a DLP™ system are controlled by loading data into the memory cell below the mirror, a data stream configured to actuate a lesser number of mirrors with different addressing will typically not be suitable for running another array. Accommodation for such differences as presented may be provided by means of hardware/software. Equipment exists that can take a given input signal at a particular resolution and either up- or down-convert the signal to a resolution that is compatible with the device at hand.

Figure 14A:
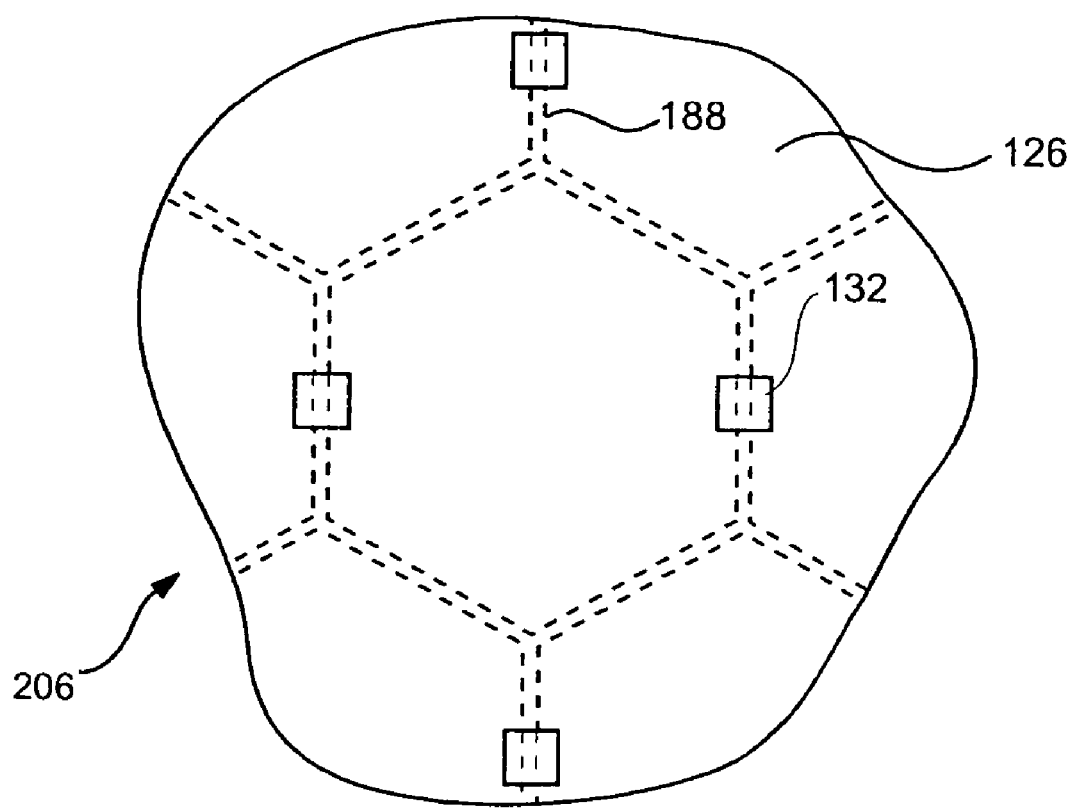
FIGS. 14A-14C show different mirror configurations in an intermediate stage of production.
Figure 14B:
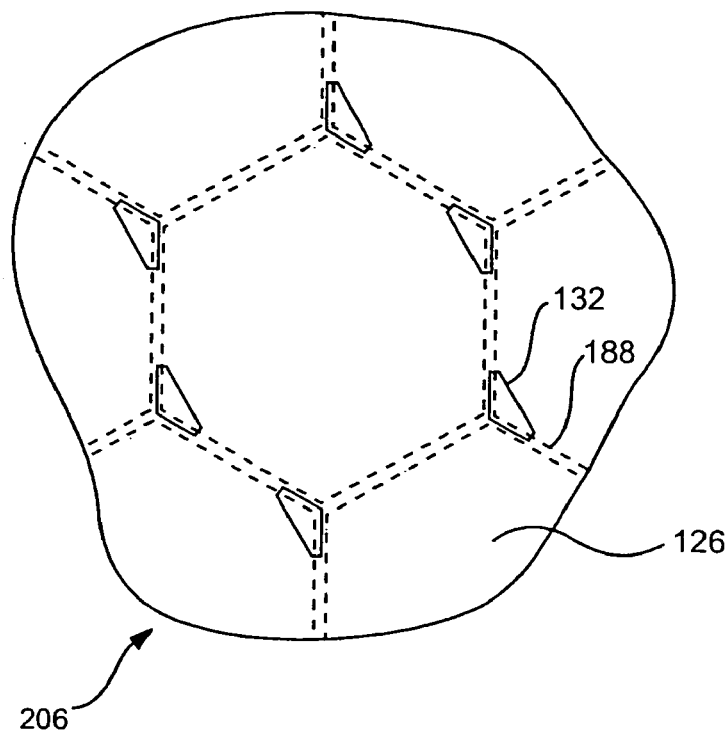
Figure 14C:
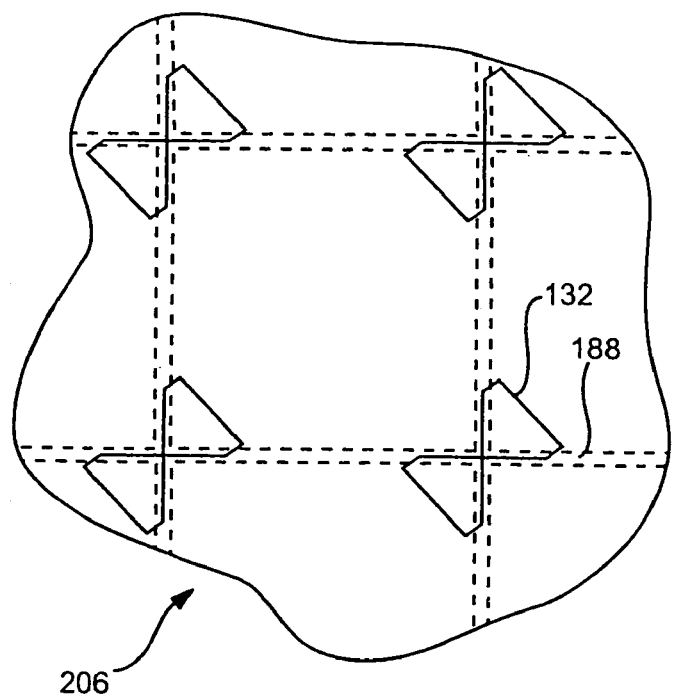

In producing mirror arrays according to the present invention, as discussed above, mirror precursor regions are provided. These are patterned in such a way as to provide for supports. Mirror precursor region sections 206 are shown for three different mirror types in FIGS. 14A-14C. Dashed lines are presented to indicate the location where individual mirror elements 126 will reside upon separation. The solid lines indicate pits or holes 132, portions of the edges will form support sections 134 (and possibly portions of the bottom forming bases 148 as well). What may be observed is that spaces 132 reside partly in the spaces 188 to be provided between each mirror element. This positioning, in effect, allows certain "theft" of space in producing the support structures. The reason for such a characterization stems from process limitations requiring that any hole in photoresist of a given depth must have a certain aspect ratio or size/diameter to be properly filled-in upon metal deposition. However, by locating open regions during manufacture in areas that must ultimately be left open anyway, losses of reflective space are minimized.

Regarding the various mirror configurations shown, each presents certain noteworthy advantages that may be realized to varying degrees depending on other material factors in array construction. These are described in turn in terms of their potential relative merits.

As to the square mirrors utilizing corner mounts, this configuration accommodates the longest hinge length for the smallest pixel area. Especially where very small mirrors/pixels are concerned, longer hinge length can be very useful. Since for a given hinge cross-section, stiffness decreases and overall torsional displacement capability increases with length, it will be possible to achieve relatively larger mirror deflection using such a design. Additionally (or alternately), the additional hinge length available allows for producing the smallest pixel size possible—at least with respect to such other mirror and connector configurations shown and discussed herein.

With the hexagonal mirrors using corner mounting points a larger relative mirror area versus hinge length can be achieved. Such a configuration provides for generating greater electrostatic forces. According, reduced voltages may be applied to deflect each mirror. Reducing voltages allows a beneficial reduction in overall device power requirements.

Regarding the hexagonal mirrors employing side mounts, this configuration accommodates a longer mirror axis perpendicular to the hinge and mirror area versus hinge length. Depending on other factors, especially hinge construction and electrode configuration, the increased lever-arm offered by the overhanging mirror portion at the corner of the mirror (as compared to the hex mirror/hinge configurations where opposite edges are parallel to the hinge) may offer greater electrostatic attraction, especially toward the extremes of mirror actuation where restoring forces from the hinge are greatest. As such, this may offer relative advantages in power consumption and/or maximum mirror deflection.

Figure 15A:
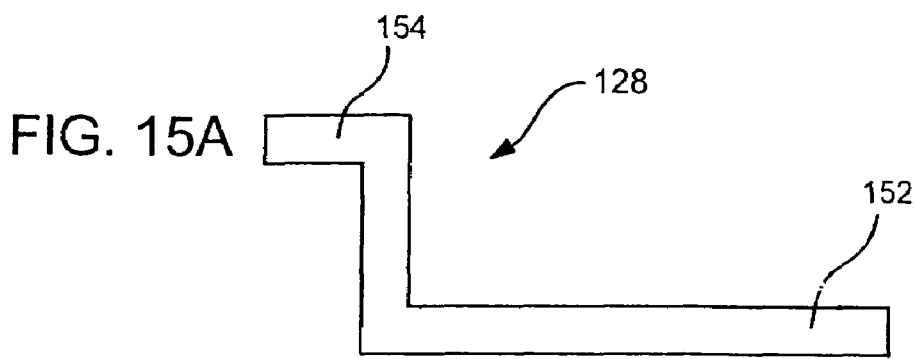
Figure 15B:
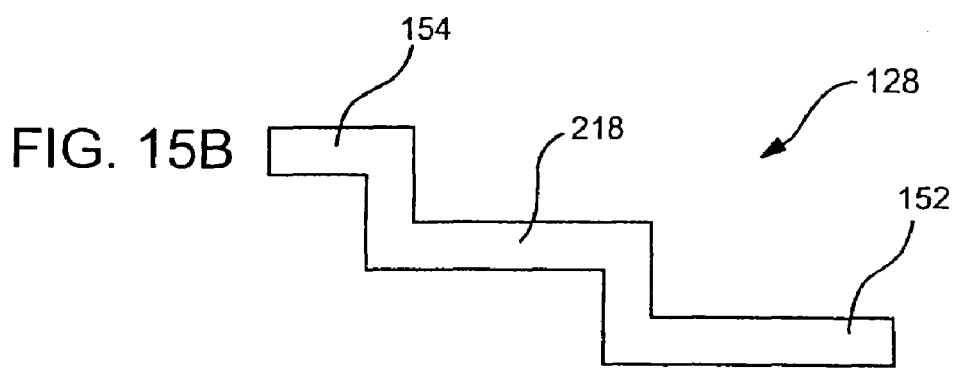
Figure 15C:
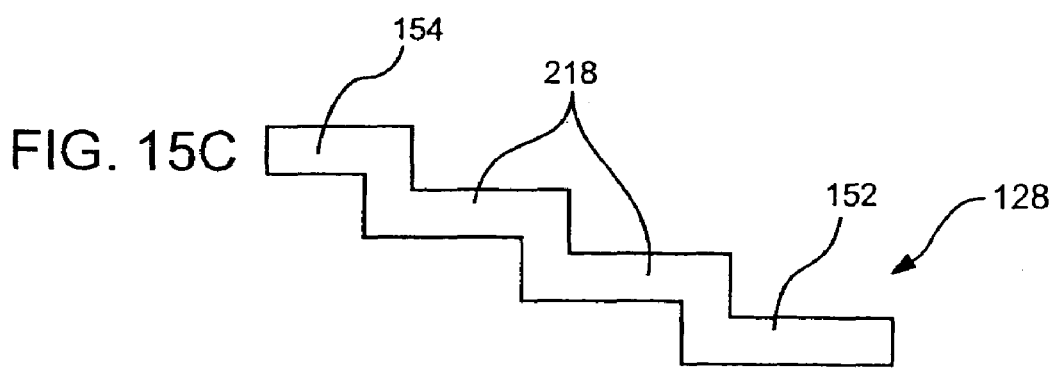
Figure 15D:
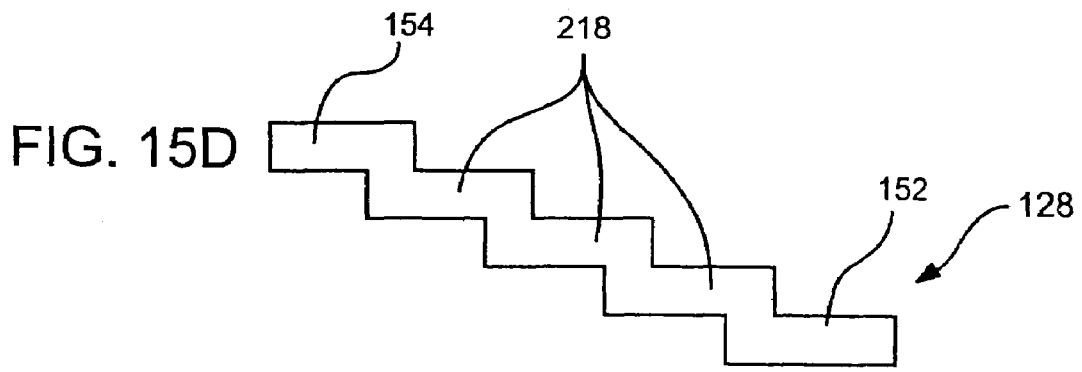
Figure 15E:
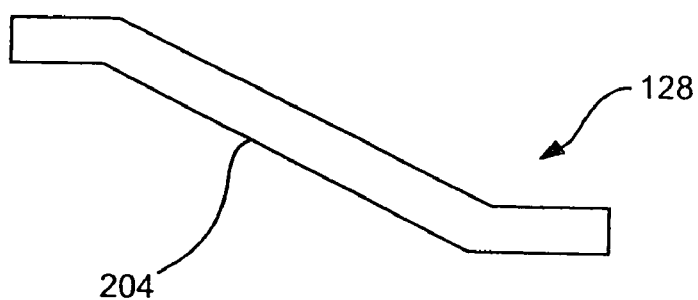
Figure 15F:
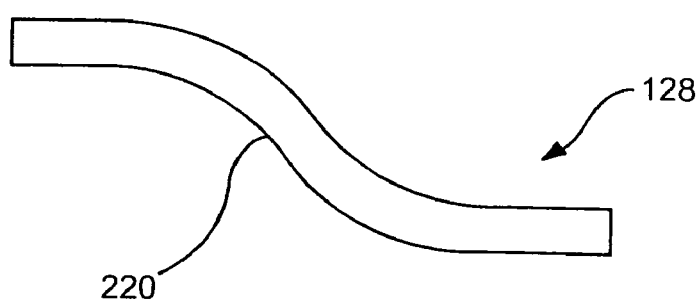

Further optional advantages in the invention may be realized utilizing different electrode configurations. The plan or top view of electrodes may, of course, be altered or optimized for a given situation. Moreover, FIGS. 15A-15H present side view of various potential electrode configurations. Each figure shows an electrode including a plurality of levels. In the variation in FIG. 15A two levels 152 and 154 are shown. Progressively more levels 218 are shown in FIGS. 15B-15D. In FIG. 15E, a continuum of levels is presented in the form of a substantially uniform or angled electrode 204. Whereas the continuum of levels in FIG. 15E provides a simply angled surface, in FIG. 15F, an electrode with a measure of curvature is provided. A curved section 220, may be useful in tailoring electrostatic attractions between an electrode and mirror (or electrode and any intermediate structure such as a yoke as in the Texas Instruments design) in order to match or otherwise account for nonlinearities in restoring force provided by flexure members. The curve shown is merely exemplary. However configured, curved and angled electrode formats may be produced utilizing advanced photolithography techniques (e.g., grayscale masking) known to those with skill in the art.

Figure 15G:
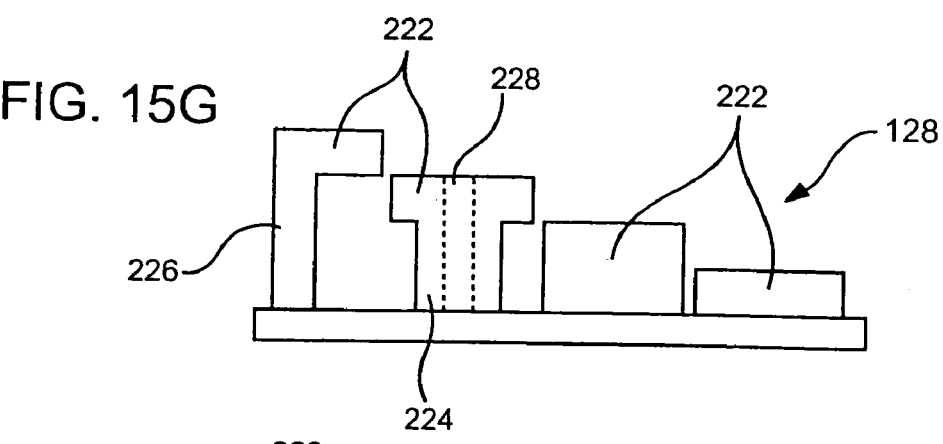
Figure 15H:
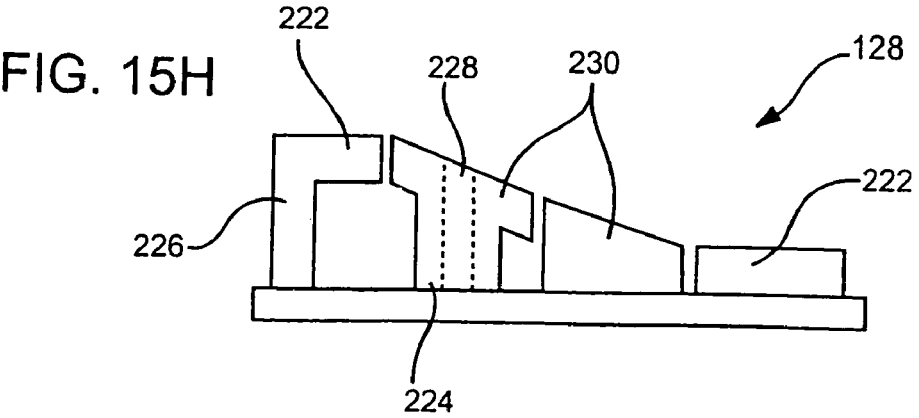

Further variation of electrode structure that is contemplated concerns providing the various electrode levels by discrete, but electrically connected, members, rather than in a continuous fashion. FIGS. 15G and 15H provide examples of such approaches. In FIG. 15G, level steps 222 are provided, optionally supported by a column 224 with a central via 228, a cantilever design 226, or any combination of electrode designs described herein. In FIG. 15H, level steps 222 and angled steps 230 are provided. Any such electrodes may be addressed individually or electrically interconnected.

Such structures may be provided by the technique(s) described above or otherwise. For example, one method involves deposition of multiple layers that build up the tiers. Alternatively, from a single deposition of conductive material, stepped electrodes can also be created using an individual mask per tier. Each mask allows selective etching to define the separate tiers of the whole electrode. Lastly, the Sandia developed SUMMiT™ technique involves a combination of these and other techniques.

Determining optimal curvature (and plan view), angle or electrode level(s)—relative to substrate 136—may be determined using known empirical and/or statistical modeling or analysis techniques. The design of such aspects of the invention may account for relationship between desired hinge/torsion bar deflection and associated stresses, together with electrostatic attractions. Certain configurations may be contemplated that have electrostatic actuation advantages for given mirror and/or deflection characteristics. Electrode shapes, in any of three dimensions, may be determined via mathematical models accounting for theoretical attractions and/or computer simulation or otherwise. For bistable operation, the electrode shapes and nature of the models may be relatively simple. Where the intent is to provide micromirror devices suited for control analog or beam steering techniques, more complex relationships between mirror angular displacement, related forcing and electrode attraction may be required.

In addition to such variation as possible in the present invention as described directly and incorporated herein, other electrode configurations and overall mirror and related hinge connection configurations are within the scope of the present invention. In the embodiments of the invention shown and such others as may be envisioned, it can be appreciated that variation may also be presented, for example, with respect to the vertical spacing of elements.

Notably, the height or relative spacing of selected items may impact the size and/or orientation of components such as the electrode regions. Namely, electrode shape and height may require customization to avoid interference in meeting desired deflection ranges of the micromirror.

In any event, numerous variations and possible micromirror device configurations and related systems can be made utilizing the various optional features disclosed herein. These variations each present certain respective advantages as suitable for a given application. Some of these advantages and applications have been described merely by way of example. Such discussion is not intended to limit the scope of the present invention. Indeed, certain variations of the invention covered hereby may not even present such advantages presented above by way of example. Further, the invention may comprise, individually, micromirror devices or element as described herein, just as it may encompass arrays of such structures. The applicability may depend on the intended use, many of which (but not all possible uses) have been mentioned.

In addition, it is noted that the features described herein in connection with MEMS processing may be applied on a relatively large scale. That is to say, as used herein the term "micromirror" may be applicable to mirror structures upwards of 1 mm in diameter/length/width. Such larger structures may find applications outside the field of known projector or monitors. In all, it is to be appreciated that devices made according to the present invention may be employed not only in the context discussed referring to displays and image projection. Further applications may involve optical switching, adaptive optics, communications, light-shaping, photocopiers, micro-displays (such as used in mobile electronics), etc.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A micromirror device comprising:
a substrate with electrical components including address circuitry, and
a micromechanical light modulator element comprising a mirror portion above the substrate,
a plurality of hinge portions separated below the mirror portion, and
means, formed between the substrate and the mirror, for sequentially attracting the mirror portion.

2. The device of claim 1, wherein the means for sequentially attracting the mirror portion further comprises a plurality of electrodes.

3. The device of claim 2, wherein the plurality of electrodes are provided by continuous members.

4. The device of claim 3, wherein at least one of said continuous members is curved.

5. The device of claim 2, wherein each of said plurality of electrodes comprises discrete members.

6. The device of claim 5, wherein said discrete members are electrically connected and set at different heights with respect to a surface of the substrate.

7. The device of claim 2, wherein said plurality of electrodes are angled with respect to a substrate surface.

8. The device of claim 2, wherein said plurality of electrodes comprise at least two heights substantially parallel to a surface of the substrate.

9. The device of claim 2, wherein said plurality of electrodes comprise at least three heights substantially parallel to a surface of the substrate.

10. The device of claim 1, wherein said electrical components are configured to operate the mirror portion in a bistable manner.

11. A micromirror device comprising:
a substrate with electrical components including address circuitry, and
a micromechanical light modulator element comprising a mirror portion above the substrate
a plurality of hinge portions separated below the mirror portion, and an electrode means, formed between the substrate and the mirror, for sequentially attracting the mirror portion.

12. The device of claim 11, wherein the electrode means further comprises a plurality of electrodes.

13. The device of claim 12, wherein the plurality of electrodes are provided by continuous members.

14. The device of claim 13, wherein at least one of said continuous members is curved.

15. The device of claim 12, wherein each of said plurality of electrodes comprises discrete members.

16. The device of claim 15, wherein said discrete members are electrically connected and set at different heights with respect to a surface of the substrate.

17. The device of claim 12, wherein said plurality of electrodes are angled with respect to a substrate surface.

18. The device of claim 12, wherein said plurality of electrodes comprise at least two heights substantially parallel to a surface of the substrate.

19. The device of claim 12, wherein said plurality of electrodes comprise at least three heights substantially parallel to a surface of the substrate.

20. The device of claim 11, wherein said electrical components are configured to operate the mirror portion in a bistable manner.

21. A micromirror device comprising:
a substrate with electrical components including address circuitry, and
an array of micromechanical light modulator elements,
each micromechanical light modulator element comprising a mirror portion having a center portion separated above said substrate, a plurality of hinge portions separated below each said mirror portion and three or more electrode portions, wherein said electrode portions are provided adjacent said substrate and said mirror portion is provided adjacent said electrode portions, a first portion of each electrode being adjacent the substrate and distal to the center of the mirror portion and another portion of the electrode being vertically above the first portion of the electrode and proximal to the center of the mirror portion, thereby providing clearance for and sequential attraction of said mirror portion by said electrode portions.

22. The device of claim 21, wherein said electrical components are configured to operate the mirror portion in a bistable manner.

23. The device of claim 21, wherein the three or more electrode portions are provided by continuous members.

24. The device of claim 23, wherein at least one of said continuous members are curved.

25. The device of claim 21, wherein each portion of the electrode comprises discrete members.

26. The device of claim 25, wherein said discrete members are electrically connected and set at different heights with respect to a surface of the substrate.

27. The device of claim 21, wherein the three or more electrode portions are angled with respect to a substrate surface.

28. The device of claim 21, wherein the three or more electrode portions comprise at least two heights substantially parallel to a surface of the substrate.

29. The device of claim 21, wherein the three or more electrode portions comprise at least three heights substantially parallel to a surface of the substrate.

30. A micromirror device comprising:
a substrate with electrical components including address circuitry, and
an array of micromechanical light modulator elements,
each micromechanical light modulator element comprising a mirror portion having a center portion separated above said substrate, a plurality of hinge portions separated below each said mirror portion and three or more electrode portions, wherein said electrode portions are provided adjacent said substrate and said mirror portion is provided adjacent said electrode portions, a first portion of each electrode being adjacent the substrate and proximal to the center of the mirror portion and another portion of the electrode being vertically below the first portion of the electrode and distal to the center of the mirror portion, thereby providing clearance for and sequential attraction of said mirror portion by said electrode portions.

31. The device of claim 30, wherein said electrical components are configured to operate the mirror portion in a bistable manner.

32. The device of claim 30, wherein the three or more electrode portions are provided by continuous members.

33. The device of claim 32, wherein at least one of said continuous members is curved.

34. The device of claim 30, wherein each portion of the electrode comprises discrete members.

35. The device of claim 34, wherein said discrete members are electrically connected and set at different heights with respect to a surface of the substrate.

36. The device of claim 30, wherein the three or more electrode portions are angled with respect to a substrate surface.

37. The device of claim 30, wherein the three or more electrode portions comprise at least two heights substantially parallel to a surface of the substrate.

38. The device of claim 30, wherein the three or more electrode portions comprise at least three heights substantially parallel to a surface of the substrate.

* * * * *